(12) United States Patent
Sasaki et al.

(10) Patent No.: US 7,616,380 B2
(45) Date of Patent: Nov. 10, 2009

(54) OPTICAL PART AND PROJECTION TYPE DISPLAY APPARATUS USING SAME

(75) Inventors: Hiroshi Sasaki, Mito (JP); Makiko Sugibayashi, Hitachi (JP); Sadayuki Nishimura, Yokohama (JP); Kiyomi Nakamura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 11/510,563

(22) Filed: Aug. 28, 2006

(65) Prior Publication Data

US 2007/0053062 A1 Mar. 8, 2007

(30) Foreign Application Priority Data

Sep. 2, 2005 (JP) ............................. 2005-254303
Mar. 29, 2006 (JP) ............................. 2006-089836

(51) Int. Cl.
*G02B 27/14* (2006.01)
*G02B 5/08* (2006.01)

(52) U.S. Cl. ........................................ 359/629; 359/838
(58) Field of Classification Search ................. 359/629, 359/359, 582–583, 634, 838, 847
See application file for complete search history.

(56) References Cited

U.S. PATENT DOCUMENTS

| 4,668,606 A * | 5/1987 | DoMinh et al. .......... 430/271.1 |
| 5,723,175 A | 3/1998 | Scholz et al. |
| 6,329,117 B1 * | 12/2001 | Padmanaban et al. ..... 430/270.1 |
| 6,383,559 B1 | 5/2002 | Nakamura et al. |
| 2003/0216495 A1 * | 11/2003 | Park et al. .................... 524/173 |
| 2004/0234799 A1 * | 11/2004 | Bohm et al. ................. 428/515 |
| 2005/0195486 A1 * | 9/2005 | Sasaki et al. ................. 359/580 |

FOREIGN PATENT DOCUMENTS

| EP | 0 193 269 | 9/1986 |
| EP | 0 797 111 | 9/1997 |
| EP | 1 277 816 | 1/2003 |
| JP | 07-092305 | 4/1995 |
| JP | 09-127303 | 5/1997 |
| JP | 2001-188104 | 7/2001 |
| JP | 2003-201443 | 7/2003 |
| JP | 2004-083307 | 3/2004 |
| JP | 2005-249982 | 9/2005 |
| JP | 2006-145709 | 6/2006 |

* cited by examiner

*Primary Examiner*—Scott J Sugarman
*Assistant Examiner*—Dawayne A Pinkney
(74) *Attorney, Agent, or Firm*—Antonelli, Terry, Stout & Kraus, LLP.

(57) ABSTRACT

The object of the present invention is to provide an optical part having an anti-reflecting membrane which is low in resistance and high in adhesion and is sharply improved in light transmittance by reducing reflectance of light, and a display apparatus using the same. According to the present invention, there are provided an optical part which transmits or partially reflects light, wherein a light receiving face or a light outgoing face has an anti-reflecting membrane which comprises inorganic oxide particles and a binder, has a thickness of 60-190 nm, and has pores of 5-200 nm in size, and a display device using the same.

17 Claims, 4 Drawing Sheets

FIG.1
(a) LENS  (b) POLARIZATION CONVERTER  (c) DICHROIC MIRROR
FIG.2
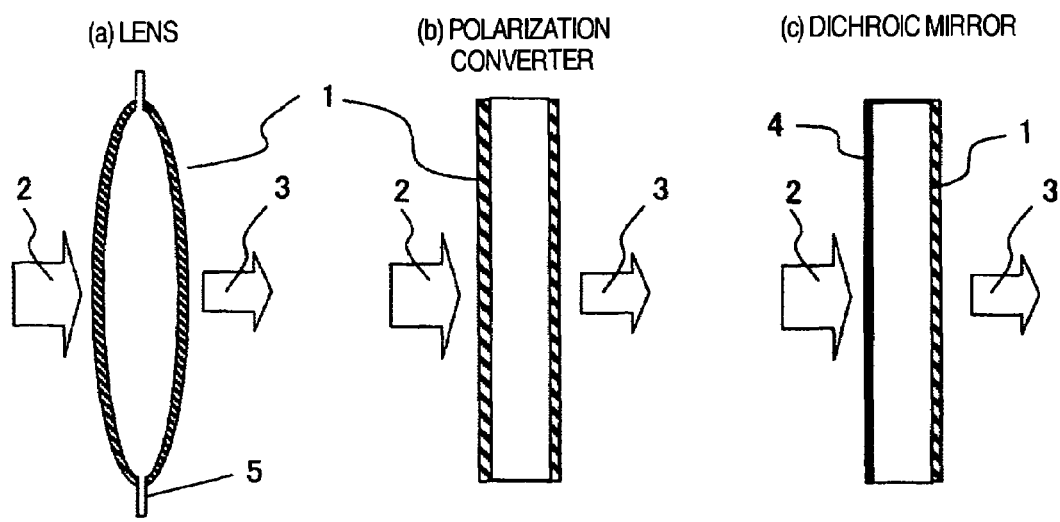
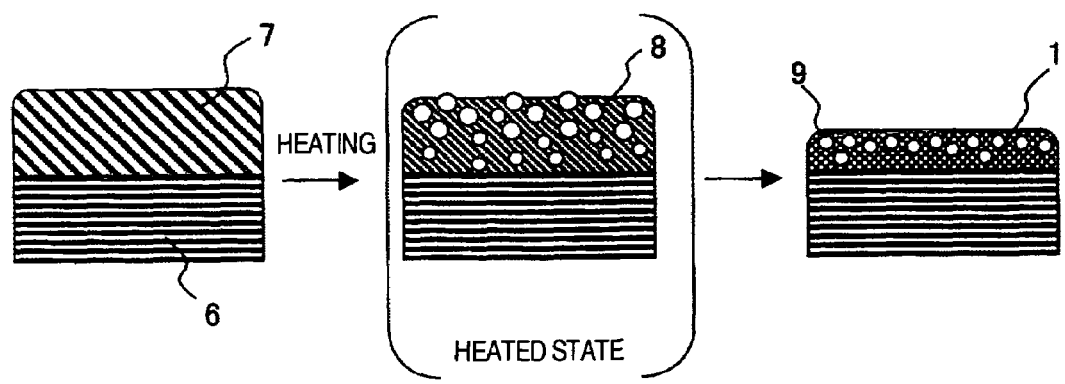

100 nm (a)

PORE PORTION (b)

NOT PORE PORTION (a) WITHOUT ANTI-REFLECTING MEMBRANE (b) WITH ANTI-REFLECTING MEMBRANE

OPTICAL PART AND PROJECTION TYPE DISPLAY APPARATUS USING SAME

BACKGROUND OF THE INVENTION

The present invention relates to a lens provided with an anti-reflecting membrane, and a projection type display apparatus using the same.

Anti-reflecting membranes are formed on the light receiving face and the light outgoing face of lenses used for cameras or telescopes because loss of light occurs due to reflection caused by difference in refractive index at the interface with air, and reflection of ambient objects on the lens surface is large in an environment of strong outer light.

Liquid crystal projectors and rear projection type liquid crystal projection televisions begin to spread in companies and general households as projection type display apparatuses which use as a light source a super high pressure mercury lamp performing irradiation of a large volume of light and which display projected images on a screen through a display device such as a liquid crystal display device.

Briefly explaining the optical system of a liquid crystal projector, the light emitted from a lamp as a light source passes through a plurality of lenses, a polarization converter, a dichroic mirror, a display device and the like, and is synthesized by a dichroic cross-prism, and displayed on a screen through a projection lens.

In the case of the rear projection type liquid crystal projection television, the image light outputted from the projection lens is corrected in its direction by a rear mirror and projected on a screen to display an image.

As mentioned above, a light travels through various optical parts, and hence if reflection at the light receiving face and light outgoing face is great, spectral volume becomes smaller, and, as a result, the image becomes darker. Therefore, anti-reflecting membranes are provided on the light receiving face and the light emitting face of the respective optical parts.

However, most of the anti-reflecting membranes used for the present optical parts are formed by vapor deposition, and hence a vacuum process is needed. Furthermore, the anti-reflecting membranes include multi-layer type and single-layer type, and the single-layer type is preferred because the multi-layer type is superior in anti-reflecting performance, but requires many production steps.

Accordingly, guidelines for designing the anti-reflecting membranes of single-layer type will be explained below.

Materials used for optical parts such as lens include transparent materials such as glass (refractive index: 1.5-1.54), acrylic resins (refractive index: 1.49), PET resins (polyethylene terephthalate resins) (refractive index: 1.56), etc. When refractive index of these materials is shown by $n_1$ and that of air is shown by $n_0$, reflectance R is represented by the following formula.

$$R=\{(n_1-n_0)/(n_1+n_0)\}^2 \quad (1)$$

Since the refractive index no of air is usually 1.0, the above formula can be shown by the following formula.

$$R=\{(n_1-1)/(n_1+1)\}^2 \quad (2)$$

When the refractive index of glass, acrylic resin and PET resin is introduced into this formula, the reflectance at one side of the transparent parts is 3.9-4.0% for glass, 3.9% for acrylic resin and 4.8% for PET resin. When a single-layer anti-reflecting membrane in a proper thickness is provided on the surface of the parts in order to reduce the reflectance, the reflectance R' can be obtained from the following formula:

$$R'=\{(n_2^2-n_0 \times n_1)/(n_2^2+n_0 \times n_1)\}^2 \quad (3)$$

in which $n_0$ is a refractive index of air layer, $n_1$ is a refractive index of the outermost surface plate, and $n_2$ is a refractive index of the membrane. Since the refractive index no of air is usually 1.0, the above formula can be shown by the following formula:

$$R'=\{(n_2^2-n_1)/(n_2^2+n_1)\}^2 \quad (4)$$

In the case of $n_2^2=n_1$, namely, $n_2=\sqrt{n_1}$, the reflectance is theoretically 0%.

When this is introduced into the above formula, the refractive index of the anti-reflecting membrane to be applied to glass is suitably about 1.22. However, as for the present materials, even fluorinated resins which are known to be relatively low in refractive index have a refractive index of about 1.34 and even magnesium fluoride which is known to be particularly low in refractive index among inorganic materials has a refractive index of about 1.38, and thus it is very difficult to obtain sufficient anti-reflecting performance with single-layer membranes.

Recently, methods for further lowering the refractive index of single-layer membranes has been proposed, one of which is use of the aerogel thin membrane disclosed in JP-A-2003-201443. The aerogel thin membrane is a thin membrane comprising fine particles having pores inside (fine hollow particles) and a binder holding the fine hollow particles. The pores in the aerogel thin membrane have a refractive index substantially the same as that of air (refractive index: 1.0), and consequently the membrane has a refractive index near that of air even when the refractive index of the material of the fine hollow particles or the binder holding the fine hollow particles is high. Thus, the reflectance can be reduced by forming the membrane on a plate.

Another method for lowering the refractive index of single-layer membrane, being different from the method of using the aerogel, is to use a membrane of low refractive index disclosed in JP-A-7-92305. It is disclosed that the surface of superfine organic particles is exposed on the side near to air, and irregularities are formed on the surface, thereby reducing the surface density, and, as a result, a membrane of low refractive index is formed.

Furthermore, another method comprises use of membrane of low refractive index having pores in the form of a honeycomb as disclosed in JP-A-2004-83307. According to this method, a plurality of pores in the form of a honeycomb structure are formed so that they pass through fine silica particles and are parallel to each other, whereby maximum pore content can be obtained without reducing the strength of fine silica particles per se. It is disclosed that according to this method, low refractive index membranes excellent in mechanical strength can be formed.

The present multi-layer anti-reflecting membranes prepared using magnesium fluoride, etc. are low in adhesion to a lens having a convex surface or concave surface, and sometimes peel off during long term use. This tendency is conspicuous especially when the material of the membranes is an acrylic resin.

Furthermore, the aerogel thin membrane disclosed in JP-A-2003-201443 has the problem of reduction in mechanical strength due to high pore content. The physical strength of membranes depends greatly upon the physical strength of the fine hollow particles. In order to lower the refractive index, it is necessary to increase the size of pores of the fine hollow particles. Aerogel thin membranes in which the thickness of shell of the fine hollow particles is thin are difficult to increase the physical strength. In case the pore is made larger by increasing the thickness of shell of the fine hollow particles, the size of particles increases and the membrane tends to scatter visible light, resulting in reduction of transmittance, which is practically unacceptable. Further problem is in the specialty of production process which uses carbon oxide of supercritical state. Particularly, for optical parts such as a lens which is not flat, but has irregularities, it is essential to consider the technology of membrane production.

Furthermore, the low refractive index membrane disclosed in JP-A-7-92305 and the low refractive index membrane having pores in the form of honeycomb structure disclosed in JP-A-2004-83307 are considered to have high mechanical strength due to crosslinking or polymerization, but there is the possibility of increase of refractive index owing to incorporation of dusts in the irregularities of the membrane surface. Moreover, in the case of these structures, the refractive index is about 1.3-1.4, which is disparate from the ideal value (lower than 1.3).

The object of the present invention is to solve the above problems. That is, the object is to provide an optical part having an anti-reflecting membrane which has both the high anti-reflecting performance and the high physical strength, and a display apparatus using the same.

Furthermore, when they are disposed under conditions of high temperature and high humidity such as hot-spring hotels and oceanfront hotels, the optical parts such as lenses and prisms in the display apparatuses get mildewed to cause decrease of light transmission. Therefore, the present invention discloses also an optical part having anti-reflecting membrane further imparted with mildew proofing function, and a display apparatus using the same.

As a result of intensive research conducted by the inventors on various materials for formation of membranes and method for formation, a method has been found according to which pores having a size of 5-200 nm are provided in a binder or between the binder and inorganic oxide particles in a membrane formed of inorganic oxide particles and a binder. It has also been found that the above membrane has a refractive index smaller that that of the binder and is excellent in physical strength because of using inorganic oxide particles having no pores although the membrane has pores inside, and further is high in adhesion to the transparent materials such as acrylic resins and glasses, and it has been found that optical parts such as lens which have the above membrane are less in reflection at the surface and high in light transmission, and besides high in physical strength since they are superior in adhesion to the surface of the membrane.

Furthermore, it has been found that the pores in the membrane are not present uniformly, but are localized in the vicinity of the surface of the anti-reflecting membrane rather than in the vicinity of the surface of the plate, and hence even if there are some differences in thickness of the membrane, the anti-reflecting function is exhibited and this function is obtained for light of a wide wavelength region.

Moreover, it has also been found that the membrane in which fine silicon dioxide particles are used as the fine inorganic oxide particles and a silicon compound having a hydrolysable residue (silica sol) is used as the binder shows a refractive index considerably smaller than that of silicon dioxide as the binder (the refractive index is specifically 1.33 or smaller) and is excellent in physical strength although it has pores inside.

In addition this membrane is also high in adhesion to the plate. Particularly, when the material is a resin such as an acrylic resin, the membrane is conspicuously higher in the adhesion as compared with the conventional anti-reflecting membranes comprising magnesium fluoride, fluorinated resins, or the like.

Moreover, since this membrane has a very small surface resistance, there is exhibited an effect that dusts such as dirt hardly adhere to the membrane even under low temperature conditions such as winter.

When they are disposed under conditions of high temperature and high humidity such as hot-spring hotels and oceanfront hotels, the optical parts such as lenses and prisms in the display apparatuses sometimes get mildewed to cause decrease of light transmission. Therefore, the present invention has an additional object to impart mildew proofing function to the anti-reflecting membrane formed on the optical parts such as lenses and prisms.

SUMMARY OF THE INVENTION

Means for attaining the above objects are as follows.

(1) An optical part which transmits or partially reflects light, characterized in that a light receiving face or a light outgoing face has an anti-reflecting membrane which comprises inorganic oxide particles and a binder, has a thickness of 60-190 nm, and has pores of 5-200 nm in size.

(2) An optical part described in the above (1), wherein the inorganic oxide particles are silicon dioxide particles and the binder comprises a silicon compound.

(3) An optical part described in the above (1) or (2), wherein the particles have a major axis diameter of not more than 190 nm and a minor axis diameter less than the thickness of the membrane.

(4) An optical part described in the above (1)-(3), wherein the anti-reflecting membrane has a layer comprising a fluorine compound on the surface.

(5) An optical part described in the above (1)-(4), wherein the fluorine compound has the following structure and the layer is bonded to the surface of the anti-reflecting membrane through chemical bonding:

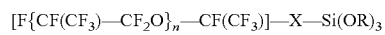

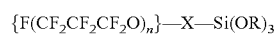

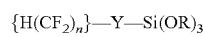

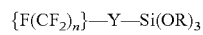

in which X is a bonding portion of perfluoro polyether chain and alkoxysilane residue, Y is a bonding portion of perfluoroalkyl chain and alkoxysilane residue, and R is an alkyl group.

(6) An optical part described in the above (1)-(5), wherein the anti-reflecting membrane contains an organic compound having a polyalkylene glycol chain.

(7) An optical part described in the above (1)-(5), wherein the anti-reflecting membrane contains an organic compound having a salt structure.

(8) An optical part described in the above (1)-(5), wherein the anti-reflecting membrane contains an organic compound having a pyridinium salt structure or a dipyridinium salt structure.

(9) An optical part described in the above (1)-(5), wherein the anti-reflecting membrane contains an organic compound having a pyridinium salt structure or a dipyridinium salt structure, and the proportion of nitrogen element in the organic compound is less than 6% by weight.

(10) An optical part described in the above (1)-(5), wherein the anti-reflecting membrane contains an organic compound having a pyridine-N-oxide structure or a dipyridyl-N-oxide structure.

(11) An optical part described in the above (1)-(5), wherein the anti-reflecting membrane contains an organic compound having a benzimidazole structure or a thiazole structure.

(12) An optical part described in the above (1)-(5), wherein the anti-reflecting membrane contains an organic compound having a halogen atom and a carbamate structure.

(13) An optical part described in the above (1)-(12) which is a lens, a polarization converter, a dichroic mirror, a display device, a dichroic-cross-prism, a light emitting tube, a mirror, or a screen.

(14) A projection type display apparatus which reflects and emits a light beam from a light source, subjects the emitted light beam from the light source to light intensity modulation by a display device, magnifies the image light subjected to light intensity modulation by a projection lens, and displays the magnified image light, wherein the anti-reflecting membrane described in the above (1)-(12) is formed on at least one light receiving face of at least one part of a plurality of lenses, a polarization converter, a dichroic mirror, a display device, a dichroic-cross-prism, a light emitting tube, a mirror, and a screen which are incorporated in the projection type display apparatus.

Other objects, features and advantages of the invention will become apparent from the following description of the embodiments of the invention taken in conjunction with the accompanying drawings.

BRIEF DESCRIPTION OF THE DRAWINGS

FIG. 1 shows an example of the optical part of the present invention.

FIG. 2 schematically shows a method for forming the anti-reflecting membrane used in the present invention.

Figure 3:
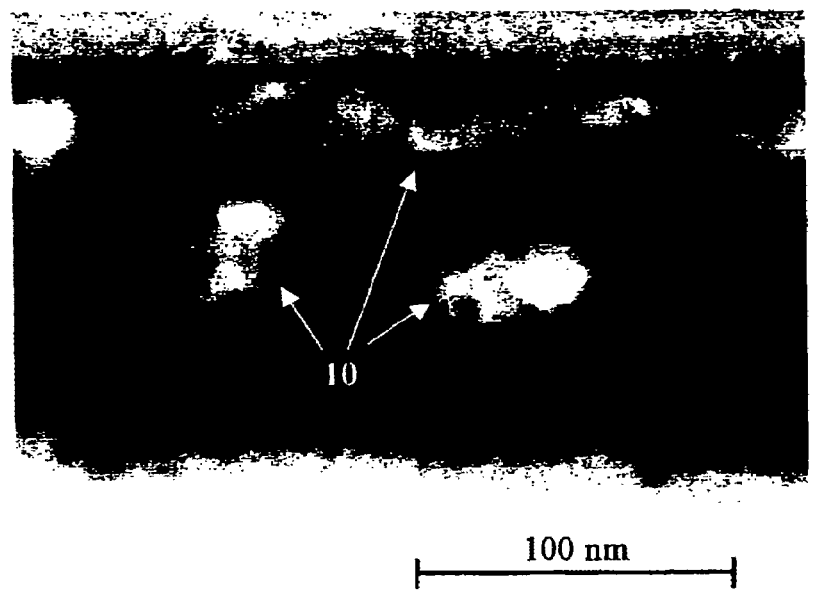
FIG. 3 is a photograph showing a section of the anti-reflecting membrane used in the present invention.

DESCRIPTION OF REFERENCE NUMERALS 1, 44—Anti-reflecting membrane, 2, 41—Incident light, 3—Outgoing light, 4, 39—Mirror face, 5—Fixing portion to optical system, 6—Plate, 7—Paint, 8—Bubbles, 9, 10—Pores, 11—Lamp, 12—Reflector, 13—Concave lens, 14—First lens array, 15—Second lens array, 16—Polarization converter, 17, 18, 19—Display device, 20, 21, 22, 23—Condenser lens, 24—First relay lens, 25—Second relay lens, 26-29—Mirror, 30, 31—Dichroic mirror, 32—Dischroic-cross-prism, 33—Projection lens, 34, 38—Screen, 35—Housing, 36—Optical unit, 37—Rear mirror, 40—Glass plate, 42—Image light, 43—Reflected light

DETAILED DESCRIPTION OF THE INVENTION

The preferred embodiments and examples of the present invention will be explained in detail referring to the drawings. Various variations can be made using the present invention, and the embodiments and examples should not be construed as limiting the invention in any manner.

FIG. 1 shows some examples of the optical parts according to the present embodiments.

Anti-reflecting membrane 1 is provided on the surface of the respective optical parts. In the lens, polarization converter, etc., the anti-reflecting membranes are provided on both the light receiving face of incident light 2 and the light outgoing face of outgoing light 3. In the dichroic mirror, the anti-reflecting membrane is provided only on the light outgoing face because the reflectance of the mirror face 4 which is a light receiving face of incident light must be enhanced. The lens in FIG. 1 is a convex lens, and the fixing portion 5 to optical system is shown at an end of the lens.

The anti-reflecting membrane provided on the surface of the optical parts according to this embodiment is formed of inorganic oxide particles and a binder. The binder functions as a binder of the anti-reflecting membrane. Basically, this membrane is formed by coating a paint comprising a mixture of at least inorganic oxide particles, a binder and a solvent on a substrate plate and heating the coat. When the binder is a thermosetting compound such as silica sol, epoxy resin monomer or melamine resin monomer, a catalyst for acceleration of polymerization, namely, thermosetting of the coat, is added to the paint in a very small amount. The anti-reflecting membrane according to this embodiment can be formed by single-layer process, but may be formed by multi-layer process.

The method for formation of the anti-reflecting membrane to be provided on the surface of the optical part according to this embodiment will be diagrammatically explained using FIG. 2.

First, paint 7 is coated on a substrate plate 6 to form a coat, followed by rapidly heating the coat. In this case, the solvent is rapidly vaporized in the coat to produce bubbles 8 in the coat. When the coat is solidified in this state, the bubble portions are maintained as pores 9 to form the anti-reflecting membrane 1 according to this embodiment.

FIG. 3 is a photograph showing a section of one example of the anti-reflecting membrane according to this embodiment, in which the anti-reflecting membrane is formed on an acrylic substrate plate.

The inorganic oxide is particle of silicon dioxide, and silica sol is used as the binder. A low refractive index membrane is formed on the acrylic plate, and furthermore carbon is formed on the membrane. Here, the carbon is formed only for avoiding rupture of the section in preparation of a sample of the section for measurement, and it does not affect the effect of the anti-reflecting membrane according to this embodiment.

It can be confirmed in FIG. 3 that some pores 10 are present inside the low refractive index membrane. The shape of the pores is indeterminate, and as for the size thereof, length of the major axis is 5-150 nm. The major axis here means an axis which can be taken at the longest distance in the pore, and the length of the major axis is the above distance.

In order to confirm the presence of pores, the present intensity of elements in the portions which are pores and the portions which are not pores is measured. The results are shown in FIG. 4.

Figure 4:
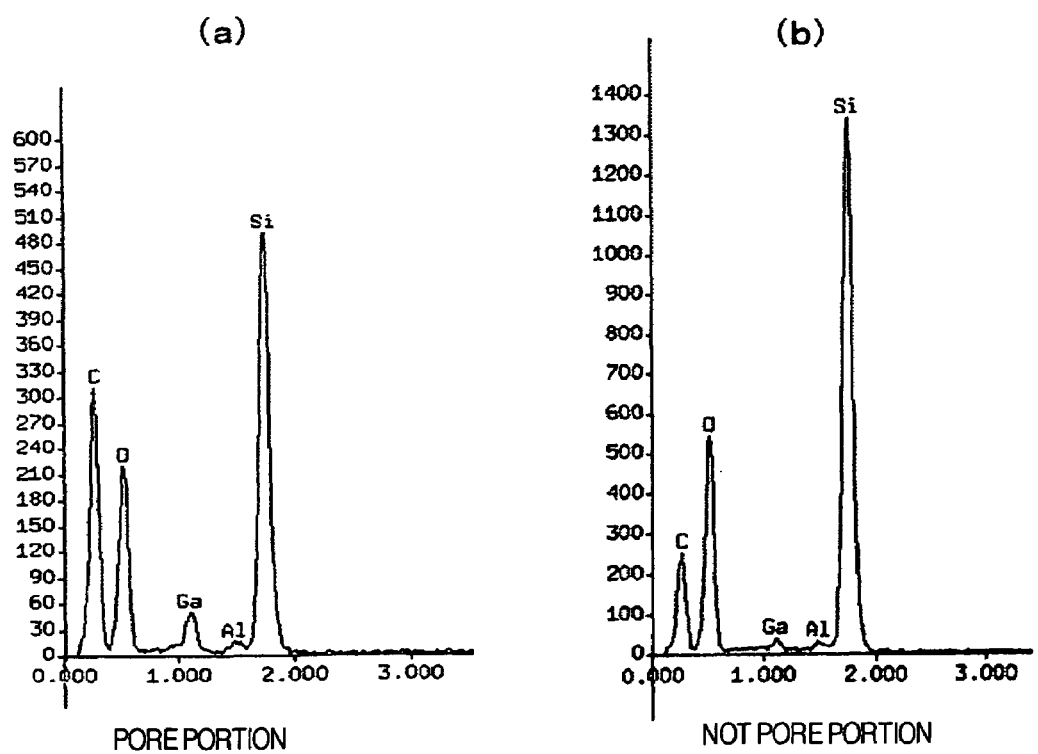
FIG. 4 shows the present intensity of elements in the anti-reflecting membrane used in the present invention, in which (a) shows the present intensity of elements in the area of the pores in the anti-reflecting membrane used in the present invention, and (b) shows the present intensity of elements in the area other than the pores in the anti-reflecting membrane used in the present invention.

It is seen from the results of FIG. 4 that the present intensity of carbon, oxygen, silicon or the like is smaller in the pore portions as compared with that in the portions which are not pores. Thus, the presence of pores can be confirmed also from these results.

The refractive index can be controlled by changing the proportions of silicon dioxide (refractive index: about 1.5) which is a binder of the membrane and pores (refractive index: about 1.0) in the membrane. Specifically, the greater the proportion of the pores, the smaller the refractive index.

Furthermore, since the vaporization of solvent in the coat during thermosetting contributes to the formation of pores, the formation of the pores can also be controlled by the boiling point of the solvent and the thermosetting temperature after coating the paint on the substrate plate.

A greater number of pores are formed in relatively upper part of the membrane (in the vicinity of the outermost surface) as is shown in FIG. 3. It is considered that this is because bubbles which begin to be formed in the paint rise to the vicinity of the surface by thermosetting, namely, by heating. That is, this means that the refractive index tends to lower gradually from the plate side, and even in the case of one layer, there is a gradient of refractive index in the layer. As a result, it is meant that the plate side has a refractive index closer to that of the plate and the surface side which is not the plate side has a refractive index closer to that of air. Thus, reflection at the interface of the plate and the anti-reflecting membrane and reflection at the interface of air and the anti-reflecting membrane can be reduced with one layer.

Due to the above properties, when membranes differing in thickness are prepared using paints of the same composition, the refractive index tends to decrease with decrease of thickness of the membranes in case the thermosetting conditions are same. This is because a greater number of pores are apt to be formed in the vicinity of the surface.

In order to form many pores not only in the vicinity of the surface, but also in the inside part, a method of using a plurality of layers can be considered. According to this method, the pores are formed not only in the vicinity of the surface, but also in the inside part, and hence the physical strength of the membrane is further improved.

Furthermore, it can be said from the photograph of section in FIG. 3 that the membrane is excellent also in rub resistance because many pores are present inside the membrane, and less pores are present in the surface of the membrane. If the pores are present in a greater number in the vicinity of the surface, the irregularities on the surface of the membrane become greater, and thus when the surface is wiped with a fabric, the fabric is apt to be caught by the irregularities, while if the irregularities are small, the fabric is hardly caught by the irregularities. Therefore, the membrane is hardly peeled off or damaged.

The materials of paint and formation of membrane will be explained in detail below.

(1) Materials of paint:

The paint comprises a binder, inorganic oxide particles and a solvent. These will be explained below.

(1-1) Binder:

As the binder, mention may be made of highly transparent organic or inorganic polymer materials and polymerizable materials. In the case of the lens substrate being a resin, when an organic membrane material is selected, the substrate plate may sometimes be swollen, deformed or dissolved depending on the solvent used. On the other hand, the inorganic materials tend to have a higher hardness, and hence are suitable. In the case of inorganic materials, those of lower refractive index are more advantageous in forming the anti-reflecting membrane. Materials of low refractive index are suitably silicon-based materials.

The organic polymer materials include thermoplastic polymer materials. Examples thereof are acrylic resins, polystyrenes, styrene-acryl copolymers, polyester resins, polyvinyl chloride, ethylene-vinyl acetate copolymers, polyethylene terephthalate resins, polyvinylidene chloride resins, polycarbonate resins, etc. The organic polymerizable materials include thermosetting polymer materials. Examples thereof are polyamic acid derivatives having aliphatic skeleton and the like.

The inorganic polymer materials include, for example, silicon compounds having a hydrolysable residue (general name: silica sol) and titanium compounds having a hydrolysable residue (general name: titania sol). These are compounds formed by polymerization of alkoxysilane or alkoxytitanium to a molecular weight of about several thousand, and are in the state of being soluble in an alcoholic solvent. A binder of silicon dioxide or titanium oxide can be formed by heating the above compound.

The inorganic polymerizable materials include, for example, alkoxysilanes having various substituents such as amino group, chloro group and mercapto group. Specific examples thereof will be shown in the explanation of silicon compounds having a hydrolysable residue given hereinafter.

As mentioned above, silicon-based materials are suitable as binders. Specifically, silicon compounds having a hydrolysable residue are suitable. They will be explained in detail below.

As one of silicon compounds having a hydrolysable residue, mention may be made of silica sol. This is a material which converts to silicon dioxide by heating. This is suitable for anti-reflecting membranes used in display apparatus since the resulting silicon dioxide is high in light transmission. Furthermore, fine silicon dioxide particles can be more easily dispersed in the membrane than acrylic resins or polycarbonate resins. If the fine silicon dioxide particles cannot be dispersed in the membrane, namely, if they agglomerate, the membrane becomes cloudy to cause scattering of incident light, resulting in decrease of light transmittance, which is not preferred. A general method for preparation of silica sol is as follows. When tetraalkoxysilane is heated under the weakly acidic condition, alkoxy group is hydrolyzed to hydroxyl group, which reacts with alkoxysilane group present nearby to increase in molecular weight with forming silicon-oxygen-silicon bond. The average molecular weight is generally several thousand. If the average molecular weight is too low (in the case of several hundred), there is a problem that a part of it is volatilized in forming silicon dioxide membrane by the subsequent heating. If the average molecular weight is too high (in the case of more than several ten thousand), it becomes insoluble in the solvent used, and hence precipitates in preparation of a paint.

The tetraalkoxysilanes used in preparation of silica sol include, for example, tetramethoxysilane, tetraethoxysilane, tetrapropoxysilane, tetraisopropoxysilane, tetraisobutoxysilane, tetrabutoxysilane, etc. Other examples are silicon compounds having chlorine group in place of alkoxysilane group, for example, silicon tetrachloride, etc.

Silicon compounds having a hydrolysable residue other than silica sol include, for example, those which have amino group, chloro group, mercapto group in addition to tetraalkoxysilanes. As examples thereof, mention may be made of 3-aminopropyltriethoxysilane, 3-aminopropyltrimethoxysilane, N-(2-aminoethyl)-3-aminopropyltrimethoxysilane, 3-chloropropyltrimethoxysilane, 3-chloropropylmethyldimethoxysilane, 3-mercaptopropyltrimethoxysilane, vinyltrimethoxysilane, vinyltriethoxysilane, 3-glycidylpropyltrimethoxysilane, 3-glycidylpropyltrimethoxysilane, 3-methacryloxypropyltrimethoxysilane, etc.

(1-2) Inorganic oxide particles:

The inorganic oxide particles include colorless or white particles of silicon dioxide, aluminum oxide, titanium oxide, cerium oxide, etc. With reference to the size of the particles, it is preferred that the minor axis of the particles is less than the average thickness of the membrane for improving flatness of the membrane. Furthermore, among the above compounds, silicon dioxide (refractive index: about 1.5-1.7) and aluminum oxide (refractive index: about 1.7-1.9) which have relatively low refractive index are suitable because membranes of low refractive index can be obtained more easily. Therefore, explanation will be made of especially the silicon dioxide particles.

When the inorganic oxide particles are spherical, the particle diameter is preferably ½ or less of wavelength so that the light entering in the membrane is not scattered. Since the wavelength region of visible light is 380-780 nm, the particle diameter is preferably 190 nm or less so that the light is not scattered in this region. When the silicon dioxide particles are spherical, the average particle diameter is preferably 190 nm or less so that the visible light entering in the membrane (wavelength: 380-760 nm) is not scattered. For behavior of particles in visible light, see "Industrial Science of Color", Yoshinobu Naya, 2nd edition, published by Asakura Shoten, Feb. 10, 1984, page 2. If the average particle diameter is more than 190 nm, the entering light is scattered and the membrane appears cloudy, and thus the membrane becomes difficult to be applied to display apparatuses. Furthermore, when the silicon dioxide particles are in the form of chains, the thickness (thickness of the cross-section perpendicular to the longitudinal direction) is also preferably 190 nm or less for the same reasons as above. With decrease of the particle diameter of the silicon dioxide particles, the transparency is improved. Therefore, the average particle diameter is preferably 100 nm or less.

There may be used in combination two or more kinds of inorganic oxide particles differing in particle diameter or shape. For example, when rod-like or chain-like particles are used, the minor axis is preferably 100 nm or less so that decrease of light transmittance is inhibited, and 40 nm or less so that decrease of the transmittance is less than 1%.

If the dispersibility of the particles in the silicon compound having a hydrolysable residue used as a binder and the solvent is insufficient, there are problems that they agglomerate to form larger secondary particles, and the membrane appears cloudy. Therefore, if possible, a solvent which satisfactorily disperse the silicon dioxide particles should be used, but such solvent cannot sometimes be used depending on the kind of the substrate plate. Therefore, in such a case, a dispersant is added. Specifically, a nonionic dispersant is suitable. A part of ionic dispersants sometimes accelerate polymerization of the silicon compound having a hydrolysable residue, and viscosity of the paint much increases before coating on the substrate plate and in some cases the paint becomes gelling or is hardened to a complete solid. Thus, the paint cannot be coated, and it is desired to confirm whether the above phenomena occur or not before use. When a dispersant is used, the strength of the membrane tends to decrease, and hence it is desirable not to use the dispersant or to use it in an amount as small as possible.

As the silicon dioxide particles, suitable is colloidal silica in which the particles are previously dispersed. The particles in the colloidal silica have many hydroxyl groups on the surface and hence are high in hydrophilicity. Further, the anti-reflecting membrane formed using the colloidal silica is hydrophilic and simultaneously very low in resistance. Specifically, it is about $1 \times 10^{10} - 10 \times 10^{10} \Omega$. This value is very small, namely, $\frac{1}{10,000}$ to $\frac{1}{1,000,000}$ of the resistance of glass, acrylic resins, polycarbonate resins, PET resins, etc. Therefore, dusts such as dirt hardly adhere to the membrane. Therefore, in a greenhouse where the membrane of the present invention is provided on the transparent faces, the volume of light entering therein increases to result in shortening of growing period of plants. In the case of image formation apparatus, dusts do not adhere to the surface for a long period of time even in a dry room, and viewers can enjoy clear images. Moreover, dusts hardly adhere to a transparent substrate plate on which the membrane of the present invention is provided, and the plate is effective as indoor building materials such as wall and partitions of clean room.

Furthermore, since many hydroxyl groups are present on the surface of the above plate, the compounds having alkoxysilane group can be bonded to the above substrate plate in a larger amount than to conventional glass plates, etc. Therefore, liquid repellants such as perfluoro polyether compounds or perfluoroalkyl compounds having alkoxysilane group mentioned hereinafter can be bonded to the above substrate plates in a larger amount than to substrate plates such as conventional glass plates. Thus, the plate can be improved in liquid repellency as compared with the conventional glass plates. Moreover, the substrate plate can be treated with liquid repellants such as perfluoro polyether compounds or perfluoroalkyl compounds having alkoxysilane group mentioned hereinafter to impart liquid repellency to the plate.

In the colloidal silica, silicon dioxide particles suitable as a constituting material of the anti-reflecting membrane have indeterminate form. In the case of the proportion in the membrane being the same, the silicon dioxide particles of indeterminate form more easily lower the refractive index of the formed membrane as compared with those of true sphere. The binder of membrane which is so-called support material is silica sol, and silicon dioxide is very low in function as a support material of the membrane. Therefore, without silica sol, it is difficult to maintain the shape as a membrane, and the membrane becomes powders. Therefore, in order to increase the physical strength of the membrane, the smaller proportion of silicon dioxide in the membrane is suitable. Though it is not clear why a membrane of lower refractive index can be formed by using silicon dioxide in the form of chain than using spherical silicon dioxide, it is supposed that in the membrane the silicon dioxide in the form of chain can more easily form pores as compared with the spherical silicon dioxide.

Other than silicon dioxide, aluminum oxide has small refractive index and is suitable, and alumina sol having many hydroxyl groups on the surface forms a membrane of low resistivity and is suitable.

(1-3) Solvent:

As solvents for paint, those which can dissolve or uniformly disperse the binder are effective.

However, in the case of the substrate plate being a resin, ketone, ether or ester solvents may swell, deform or dissolve the plate in some cases, and, hence, care should be taken in using them. Alcohol solvents are suitable when the paint contains the silicon compound having hydrolysable residue suitable as the binder and the silicon dioxide particles suitable as the inorganic oxide particles. Examples of the alcohol solvents are ethanol, n-propanol, iso-propanol, n-butanol, iso-butanol, tert-butanol, n-pentanol, iso-pentanol, tert-pentanol, etc. The alcohol solvents are suitable because they hardly swell, deform or dissolve the substrate plate formed of polycarbonate resin, acrylic resin, etc. Furthermore, the alcohol solvents having many carbon atoms tend to be high in boiling point. Moreover, with increase of the number of branched-parts, the boiling point tends to decrease. In preparation of membrane mentioned hereinafter, a membrane of low refractive index can be more easily prepared when the boiling point is somewhat lower than the thermosetting temperature. This is because the volume of pores produced with vaporization of the solvent in the membrane increases.

(1-4) Dispersant:

When the inorganic oxide particles agglomerate, they scatter the incoming light. Therefore, there are problems that the transmittance lowers or the membrane becomes cloudy. Especially, this tendency is conspicuous when the diameter of the inorganic oxide particles is 60 nm or more. This is because even when a small number of particles agglomerate, the major axis of the agglomerate is 100 nm or more to hinder transmission of light in the visible region. Therefore, it becomes possible to inhibit the agglomeration of the particles by adding a dispersant.

Actually, when silicon dioxide particles of 60 nm in particle diameter are used in forming the anti-reflecting membrane on a convex lens, in the case of forming the anti-reflecting membrane using a paint containing no dispersant, transmittance for light having a wavelength of 550 nm is 97%, while the transmittance increases to 99% by adding 1% by weight (on solid content of the membrane) of a dispersant having polyalkylene glycol chain. Thus, the effect of the dispersant is admitted. The same effect can be admitted when a dispersant having an ammonium sulfonate structure at the end is used in place of the dispersant having polyalkylene glycol chain.

The amount of the dispersant added is about 0.1-5% by weight based on the solid content of the anti-reflecting membrane, and is suitably controlled depending on the proportion of the particles or the like.

Nonionic and ionic surfactants are effective as the dispersant.

(i) Nonionic Surfactants

The nonionic surfactants include, for example, compounds having polyalkylene glycol chain. The polyalkylene glycol chain has hydrophilic property and is adsorbed to hydroxyl group, oxygen atom or the like on the surface of the inorganic oxide particles or is localized in the vicinity of the particles. On the other hand, the portions other than the polyalkylene glycol chain is preferably a structure hydrophilic with solvent, for example, alkyl chain, alkylene chain or the like.

Polyethylene glycol chain is preferably such that the repeating structure comprises a unit having 3 or less carbon atoms, such as oxyethylene unit or oxypropylene unit. If the number of carbon atoms in the unit is 4 or more, the hydrophilicity tends to lower, and hence the amount as the dispersant must be increased. In this case, there is the possibility that the pores in the membrane are blocked with the dispersant and the refractive index does not decrease to affect the anti-reflecting performance.

(ii) Ionic Surfactants

As the ionic surfactants, preferred are those in which anion portion is sulfonate ion or carboxylic acid ion. The cation portion is preferably an alkali metal ion such as sodium ion, potassium ion or lithium ion, an alkaline earth metal ion such as magnesium ion or calcium ion, ammonium ion, or the like.

(1-5) Mildew Proofing Agents

As mentioned above, if the optical parts used in display apparatuses get mildewed under the conditions of high temperature and high humidity, light transmittance lowers, resulting in dark and unclear images. Therefore, by giving a mildew proofing function to the anti-reflecting membrane provided on the surface of the optical parts, it becomes possible to provide properly bright and clear images even under the conditions of high temperature and high humidity. It is necessary that the mildew proofing agents added show substantially no absorption of the light having a wavelength necessary for formation of images, namely, a wavelength in visible region and has compatibility with the paint which forms the anti-reflecting membrane.

Since it is supposed to use an alcohol solvent in the case of the paint containing the silicon dioxide particles suitable as the inorganic oxide particles in the above (1-3), the mildew proofing agent is also desired to be soluble in the alcohol solvent. Further, there is the possibility that the mildew proofing agent easily soluble in water dissolves out of the anti-reflecting membrane in an environment of high humidity. In this case, there is a fear of the mildew proofing agent running out of the surface of the optical part when exposed to high humidity environment for a long period of time, resulting in deterioration of mildew proofing ability. Therefore, the mildew proofing agent is preferably not high in solubility in water.

From the above viewpoints, it is considered that groups of compounds having the following structures are suitable as the mildew proofing agents.

(i) A group of organic compounds having pyridinium salt structure or dipyridinium salt structure:

Chemical structure of the compounds having pyridinium salt structure is shown below.

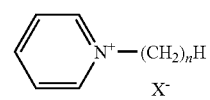

In the above structure, X is a halogen atom, specifically, chlorine, bromine or iodine. Nitrogen in the pyridine ring is of a quaternary salt structure, and since this portion is hydrophilic, water-solubility and water-absorbability are lowered with increase of hydrophobic portion, namely, the portion of alkyl chain. The symbol n represents carbon number of the alkyl chain, and with increase of n, the compound becomes sparingly soluble in water. Considering the use in environment of high humidity, the larger carbon number is preferred, in other words, the smaller proportion of nitrogen in the molecule is preferred. Specifically, the proportion of nitrogen in the compound is preferably less than 6% by weight. For example, in the case of X being chlorine, n is preferably 9 or more, in the case of X being bromine, n is preferably 6 or more, and in the case of X being iodine, n is preferably 2 or more.

Since these compounds show substantially no absorption of visible region, the anti-reflecting membranes containing these compounds are colorless even by visual inspection. Since the portion exhibiting the mildew proofing function is the portion of the quaternary salt structure of nitrogen in the pyridine ring, the mildew proofing function tends to be enhanced with decrease of n when the compounds are added at the same weight ratio.

Next, chemical structure of the compounds having the dipyridinium salt structure is shown below.

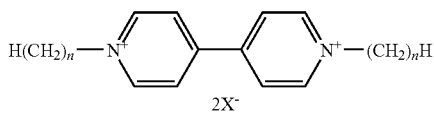

In the above structure, X is also a halogen atom, specifically, chlorine, bromine or iodine. Nitrogen in the bipyridyl ring has also a quaternary salt structure, and since this portion is hydrophilic, water-solubility and water-absorbability is lowered with increase of hydrophobic portion, namely, the portion of alkyl chain. As in the compounds having the pyridunium salt structure, the proportion of nitrogen in the molecule is preferably smaller. Specifically, the proportion of nitrogen in the compound is preferably less than 6% by weight. For example, in the case of X being chlorine, n is preferably 10 or more, in the case of X being bromine, n is preferably 9 or more, and in the case of X being iodine, n is preferably 7 or more.

Since these compounds show substantially no absorption of light in visible region, the anti-reflecting membranes containing these compounds are colorless even by visual inspection. Since the portion exhibiting the mildew proofing function is the portion of the quaternary salt structure of nitrogen in the bipyridyl ring, the mildew proofing function tends to enhance with decrease of n when the compounds are added at the same weight ratio. Furthermore, as compared with the compounds having dipyridinium salt structure, they have higher mildew proofing function, and hence they exhibit high mildew proofing function even with addition in a slight amount.

(ii) Organic Compounds Having Pyridine-N-Oxide Structure or Dipyridyl-N-Oxide Structure:

The pyridine-N-oxide structure is shown below.

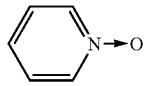

The organic compounds having pyridine-N-oxide structure have this structure in the molecule.

Since the above structure shows substantially no absorption of light in visible region, the anti-reflecting membranes containing the structure are colorless even by visual inspection. The portion exhibiting the mildew proofing function is the pyridine-N-oxide structure.

The dipyridyl-N-oxide structure is shown below.

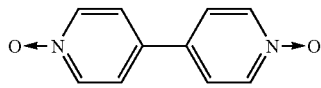

The organic compounds having the dipyridyl-N-oxide structure have this structure in the molecule.

Since the above structure shows substantially no absorption of light in visible region, the anti-reflecting membranes containing the structure are colorless even by visual inspection. The portion exhibiting the mildew proofing function is the dipyridyl-N-oxide structure.

(iii) Organic Compounds Having Benzimidazole Structure, Thiazole Structure or Iso-Thiazole Structure:

The benzimidazole structure is shown below.

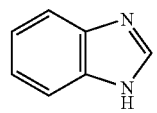

The organic compounds having the benzimidazole structure have this structure in the molecule.

Since the above structure shows substantially no absorption of light in visible region, the anti-reflecting membranes containing the structure are colorless even by visual inspection. The portion exhibiting the mildew proofing ability is the benzimidazole structure.

The thiazole structure is shown below.

The organic compounds having the thiazole structure have this structure in the molecule.

Since the above structure shows substantially no absorption of light in visible region, the anti-reflecting membranes containing the structure are colorless even by visual inspection. The portion exhibiting the mildew proofing function is the thiazole structure.

The iso-thiazole structure is shown below.

The organic compounds having the iso-thiazole structure have this structure in the molecule.

Since the above structure shows substantially no absorption of light in visible region, the anti-reflecting membranes containing the structure are colorless even by visual inspection. The portion exhibiting the mildew proofing function is the iso-thiazole structure.

(iv) Organic Compounds Having Halogen Atom and Carbamate Structure:

Chemical structure of these compounds is shown below.

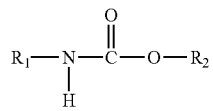

The carbamate structure is the portion of —NHCOO—. $R_1$ and $R_2$ are alkyl chains or alkyl chains having halogen atom.

Since the above structure shows substantially no absorption of light in visible region, the anti-reflecting membranes containing the structure are colorless even by visual inspection. The exhibition of the mildew proofing function is supposed to be synergistic effect of the carbamate structure and chlorine, bromine or iodine atom.

Among the above organic compounds, the organic compounds having benzimidazole structure and the organic compounds having carbamate structure have a tendency not to change much in anti-reflecting performance (specifically a tendency to show substantially no change in refractive index of the membrane) even when the amount of the compound added to the membrane is larger, and in this respect, these compounds are suitable for the optical parts and image display apparatuses of the present invention.

(2) Method for Production of Membrane:

The membrane of low refractive index according to this embodiment is formed by pretreatment of substrate plate, coating and heating. It can be formed by single-layer process, but may also be formed by multi-layer process. Furthermore, for improving rub resistance, a post-treatment after heating can be carried out. Details of the treatments will be explained.

(2-1) Pretreatment

In the pretreatment, cleaning of substrate plate and improvement of wettability of the substrate plate are carried out for uniformly adhering the paint.

1) Cleaning of Substrate Plate

Solvents or cleaning agents which can sufficiently dissolve or remove the dirt adhering to the substrate plate are used for the cleaning of the substrate plate. However, in the case of the substrate plate being a resin such as an acrylic resin or polycarbonate resin, preferably alcohol solvents such as methanol, ethanol, propanol and butanol are used rather than those solvents which cause generation of cloudiness owing to dissolution of the surface (such as tetrahydrofuran, dioxane, etc.). In the case of the substrate plate being glass, the dirt can be removed together by thinly etching the surface by dipping in a basic solution (e.g., aqueous sodium hydroxide solution).

2) Improvement of Wettability of Surface

Since the paint is uniformly coated by improving the wettability of the substrate plate, the thickness is less in variation to provide good optical characteristics. Furthermore, since adhesion between the substrate plate and the membrane is improved, the membrane strength is improved. In order to improve wettability of the substrate plate, there are a method of surface modification using apparatuses such as plasma irradiators and a method of chemical modification of the surface with an acidic or basic solution, or the like.

Method of Surface Modification Using Apparatus:

The method includes, for example, oxygen plasma irradiation, exposure to an ozone atmosphere, and UV irradiation. According to these methods, active oxygen acts on the surface of the substrate plate to produce hydroxyl groups, carboxyl groups or the like. Since these groups are hydrophilic, the surface on which they are produced is improved in wettability. Therefore, a membrane of uniform thickness can be easily obtained by coating the paint. According to the UV irradiation, oxygen in the air is changed to oxygen in active state, which modifies the surface, and hence the UV irradiation results in the similar effects to those of oxygen plasma irradiation and exposure to ozone atmosphere. Other methods include argon plasma irradiation. The wettability is also improved by argon plasma irradiation. However, in case the output of high frequency electric source of plasma generation apparatus is the same, the argon irradiation requires a longer irradiation time than the oxygen plasma.

Method of Chemical Modification:

When glass is dipped in an aqueous sodium hydroxide solution, silicon-oxygen bonds on the surface are cut to produce hydroxyl groups and hence the wettability is improved. As in the case of glass, when an acrylic plate is dipped in a basic solution, the wettability is improved, but this is according to such a principle that ester groups on the surface are hydrolyzed to cause exposure of hydroxyl groups or carboxyl groups, thereby to improve the hydrophilic property of the surface.

(2-2) Coating Method

Spin coating, dip coating, bar coating, coating by applicator, spray coating, flow coating, etc. can be employed, and the coating method is not particularly limited. For controlling to proper thickness, it is necessary to use proper concentration of paint and proper conditions of the respective coating method. In the case of spin coating, the number of revolution and time of revolution affect the thickness of membrane. Particularly, the number of revolution greatly affect the thickness, and the larger number of revolution gives the thinner membrane. In the case of dip coating, the dipping time and take-up speed affect the thickness of membrane. Particularly, the take-up time greatly affects the thickness, the lower take-up speed tends to result in decrease of thickness. Depth of the groove on the surface of the bar in the case of bar coating, size of gap in the case of coating by applicator, moving speed of spray in the case of spray coating, and angle in holding the substrate plate, and amount of paint used in the case of flow coating are the respective coating conditions.

The objective thickness in coating is desirably 60-190 nm. Theoretically, the reflectance becomes minimum in the case of $t=\lambda/4n$ in which t is thickness, $\lambda$ is wavelength of entering light, and n is refractive index of medium in which light enters (transparent substrate plate, and the anti-reflecting membrane of the present invention).

Considering that the optical part is used when the entering light is in the region of-visible light (380-760 nm), and the refractive index of the medium is about 1.0 of air to about 1.7 of a transparent glass substrate plate which is relatively high refractive index, the desired minimum thickness is $380/(4\times1.7)$ =56 nm. If the thickness is less than 56 nm, it cannot sufficiently affect the reflectance when a light in the visible light region enters. Taking into consideration the distribution of thickness, the minimum thickness is desirably 60 nm which is somewhat larger than 56 nm. On the other hand, since the maximum thickness is 760 nm/(4×1.0)=190 nm, 190 nm is desirable. Under the above conditions, the thickness of the membrane of the present invention is suitably 60-190 nm. Luminosity factor varies between individuals. A wavelength ($\lambda$) at which relative spectral responsivity attains a maximum in the photopic relative luminosity curve ("Industrial Science of Color", Yoshinobu Naya, 2nd edition, published by Asakura Shoten, Feb. 10, 1984, pages 4 to 80) is around 555 nm. In other words, a wavelength at which men's luminosity factor attain a maximum is around 555 nm in a bright atmosphere. Furthermore, the refractive index of an anti-reflecting membrane at which the reflectance can be theoretically reduced to 0% determines depending on the refractive index of the substrate plate used, and a square root of the refractive index of the substrate plate is the refractive index of the anti-reflecting membrane. As the substrate plates used in image display apparatuses such as monitors, there may be used glass, acrylic resin, PET resin, or the like, and it is desired that an anti-reflecting membrane of 1.22-1.24 in refractive index is used in the case of glass of 1.50-1.54 in refractive index, an anti-reflecting membrane of 1.22 in refractive index is used in the case of acrylic resin of 1.49 in refractive index, and an anti-reflecting membrane of 1.25 in refractive index is used in the case of PET resin of 1.56 in refractive index. Thus, the thickness of the anti-reflecting membrane which can theoretically reduce the reflectance of the substrate plate having a refractive index of 1.5 in a wavelength of 555 nm is 116 nm. Since the reflectance of one side of the substrate plate having no anti-reflecting membrane is about 4%, the thickness of the anti-reflecting membrane which can reduce the reflectance to 4% or less is in the range of 90 nm to 140 nm.

(2-3) Heating

After the coating step, heating is carried out for volatilizing the solvent or allowing the polymerization to proceed for some binder. When the heating temperature is higher than the boiling point of the solvent, bubbles are generated in the membrane and remain finally as pores to lower the refractive index of the membrane.

The heating temperature must be lower than the heat resisting temperature of the substrate plate in addition to the boiling point of the solvent, and, furthermore, when a thermosetting material is used as the binder, the heating temperature must be higher than the thermosetting temperature. Therefore, it is necessary to select the solvent, the substrate plate and the binder so as to satisfy the above requirements. Furthermore, if there is difference in volumetric shrinkage of the membrane and the substrate plate in cooling after the heating, there may occur peeling of the membrane and deformation of the substrate plate, and hence it is desired to select the substrate plate and membrane which comprise similar materials or have similar linear expansion coefficient. From this viewpoint, when silica sol suitable as a binder and silicon dioxide particles suitable as the inorganic oxide particles are used, the membrane formed by heating becomes silicon dioxide, and, hence, glass or quartz which is similar to silicon dioxide in linear expansion coefficient is suitable as the substrate plate.

(2-4) Outline of Post-Treatment

The anti-reflecting membrane of the present invention is formed by thermal cure, and the fouling resistance of the surface is improved by forming a layer comprising a fluorine compound having liquid repellency. However, the layer comprising a fluorine compound having liquid repellency must be very thin so that the anti-reflecting effect of the anti-reflecting membrane formed is not deteriorated. Specifically, the influence on the reflectance can be avoided by reducing the thickness of the layer to less than 56 nm as mentioned in the above (2-2). The thickness of the liquid repellent layer at which the influence on the reflectance is less than 1% is less than 6 nm according to our research in the wavelength of 555 nm at which men's luminosity factor is high.

Formation of the layer comprising a fluorine compound having liquid repellency is carried out in the following two manners.

Coating with a Layer of a Fluorine Compound Having Liquid Repellency:

This is a method for formation of a coating layer which comprises a fluorine compound having liquid repellency. The liquid repellency is exhibited by covering the surface with the coating layer. Therefore, in case the anti-reflecting membrane is low in resistance, since it is covered with the fluorine compound having liquid repellency, the surface resistance increases and dusts are apt to adhere to the surface.

As the material forming the layer, mention may be made of CYTOP (Asahi Glass Co.), INT 304VC (INT Screen Co.) and the like. The layer is formed by diluting the above material with a solvent, coating the solution and heating the coat to volatilize the solvent, and, if necessary, thermo-curing the coat.

Bonding of Perfluoro Polyether Compound or Perfluoroalkyl Compound:

This is a method of bonding to the anti-reflecting membrane a perfluoro polyether compound or perfluoroalkyl compound having at the end an alkoxysilane group capable of bonding with hydroxyl group. Specifically, the compound as shown below is bonded to the anti-reflecting membrane.

$[F\{CF(CF_3)-CF_2O\}_n-CF(CF_3)]-X-Si(OR)_3$ $\{F(CF_2CF_2CF_2O)_n\}-X-Si(OR)_3$ $\{H(CF_2)_n\}-Y-Si(OR)_3$ $\{F(CF_2)_n\}-Y-Si(OR)_3$

In the above formulas, X is a bonding portion of perfluoro polyether chain and alkoxysilane residue, Y is a bonding portion of perfluoroalkyl chain and alkoxysilane residue, and R is an alkyl group.

In this case, the surface of the anti-reflecting membrane is not completely covered, but the perfluoro polyether chain or perfluoroalkyl chain is in such a state that grass grows on the anti-reflecting membrane. Since the surface of the anti-reflecting membrane is not completely covered, in the case of the membrane being low in resistance, namely, $10^{11}\Omega$ or less, the membrane can maintain this low resistance after carrying out the above treatment.

Furthermore, by forming the perfluoro polyether chain or perfluoroalkyl chain on the surface, lubricity of the surface is also improved. Therefore, occurrence of physical damages of the surface caused by rubbing can be inhibited and a surface of high rub resistance can be formed.

From the above, in forming the liquid repellent layer, it is advantageous to employ a method which uses perfluoro polyether compound or perfluoroalkyl compound having alkoxysilane group at the end from the points of maintenance of low resistance of the surface and improvement of rub resistance in addition to fouling resistance.

(2-5) Liquid Repellants Used in the Post-Treatment

As mentioned in (2-4), a perfluoro polyether compound or perfluoroalkyl compound having alkoxysilane group at the end is effective as the liquid repellant. Examples of the liquid repellants and method for formation of liquid repellent layer will be shown below.

Liquid Repellants:

Specifically, the following compounds 1-12 can be mentioned as the perfluoro polyether compound or perfluoroalkyl compound having alkoxysilane group at the end.

| | |
|---|---|
| $F\{CF(CF_3)-CF_2O\}_n-CF(CF_3)-CONH-(CH_2)_3-Si(OCH_2CH_3)_3$ | Compound 1 |
| $F\{CF(CF_3)-CF_2O\}_n-CF(CF_3)-CONH-(CH_2)_3-Si(OCH_3)_3$ | Compound 2 |
| $F\{CF_2CF_2CF_2O\}_n-CF_2CF_2-CONH-(CH_2)_3-Si(OCH_2CH_3)_3$ | Compound 3 |
| $F\{CF_2CF_2CF_2O\}_n-CF_2CF_2-CONH-(CH_2)_3-Si(OCH_3)_3$ | Compound 4 |
| $H(CF_2)_6-CONH-(CH_2)_3-Si(OCH_2CH_3)_3$ | Compound 5 |
| $H(CF_2)_6-CONH-(CH_2)_3-Si(OCH_3)_3$ | Compound 6 |
| $H(CF_2)_8-CONH-(CH_2)_3-Si(OCH_2CH_3)_3$ | Compound 7 |
| $H(CF_2)_8-CONH-(CH_2)_3-Si(OCH_3)_3$ | Compound 8 |
| $F(CF_2)_6-(CH_2)_2-Si(OCH_3)_3$ | Compound 9 |
| $F(CF_2)_8-(CH_2)_2-Si(OCH_3)_3$ | Compound 10 |
| $F(CF_2)_6-(CH_2)_2-Si(OCH_2CH_3)_3$ | Compound 11 |
| $F(CF_2)_8-(CH_2)_2-Si(OCH_2CH_3)_3$ | Compound 12 |

Among them, compounds 1-8 are obtained by the following synthesis methods. Compounds 9-12 are commercially available from Hydrus Chemical Co. as 1H,1H,2H,2H-perfluorooctyltrimethoxysilane, 1H,1H,2H,2H-perfluorooctyltriethoxysilane, 1H,1H,2H,2H-perfluorodecyltrimethoxysilane, and 1H,1H,2H,2H-perfluorodecyltriethoxysilane. Other commercially available compound is Daikin Industries' OPTOOL DSX. In the compounds 1-4, fluorine chain is perfluoro polyether, and the liquid repellent coating layers formed by the compounds having this fluorine chain have the feature that they show substantially no decrease of water repellency (decrease of less than 5°) even they contact with oil or cigarette smoke in addition to water over a long period of time (1000 hours). These compounds are represented by the following formulas.

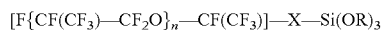

[F{CF(CF$_3$)—CF$_2$O}$_n$—CF(CF$_3$)]—X—Si(OR)$_3$

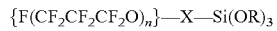

{F(CF$_2$CF$_2$CF$_2$O)$_n$}—X—Si(OR)$_3$

In the above formulas, X is a bonding portion of perfluoro polyether-chain and alkoxysilane residue, and R is an alkyl group.

By using the above compounds, it becomes possible to form anti-reflecting membranes having high fouling resistance even in an environment in which they may be contaminated with engine oil or gasoline.

In the case of using compounds 5-12, when the resulting anti-reflecting membranes contact with oil or cigarette smoke over a long period of time (1000 hours), the contact angle with water lowers from the contact angle before dipping (about 110°) to nearly the same level as the contact angle of the substrate plate.

(Synthesis of Compound 1)

Dupont's Krytox 157FS-L (average molecular weight: 2500) (25 parts by weight) was dissolved in 3M's PF-5080 (100 parts by weight), and thionyl chloride (20 parts by weight) was added to the solution, followed by refluxing for 48 hours with stirring. Thionyl chloride and PF-5080 were volatilized by an evaporator to obtain an acid chloride of Krytox 157FS-L (25 parts by weight). Thereto were added PF-5080 (100 parts by weight), Chisso's Sila-ace S330 (3 parts by weight) and triethylamine (3 parts by weight), followed by stirring at room temperature for 20 hours. The reaction mixture was filtered with Showa Chemical Industry's filtration aid RADIOLITE Fine Flow A, and PF-5080 in the filtrate was volatilized by an evaporator to obtain compound 1 (20 parts by weight).

(Synthesis of Compound 2)

Compound 2 (20 parts by weight) was obtained in the same manner as in synthesis of the compound 1, except that Chisso's Sila-ace S360 (3 parts by weight) was used in place of Chisso's Sila-ace S330 (3 parts by weight).

(Synthesis of Compound 3)

Compound 3 (30 parts by weight) was obtained in the same manner as in synthesis of the compound 1, except that Daikin Industies' DEMNUM SH (average molecular weight: 3500) (35 parts by weight) was used in place of Dupont's Krytox 157FS-L (average molecular weight: 2500) (25 parts by weight).

(Synthesis of Compound 4)

Compound 4 (30 parts by weight) was obtained in the same manner as in synthesis of the compound 1, except that Chisso's Sila-ace S360 was used in place of Chisso's Sila-ace S330 (3 parts by weight), and Daikin Industies' DEMNUM SH (average molecular weight: 3500) (35 parts by weight) was used in place of Dupont's Krytox 157FS-L (average molecular weight: 2500) (25 parts by weight).

(Synthesis of Compound 5)

Compound 5 (3.5 parts by weight) was obtained in the same manner as in synthesis of the compound 1, except that Daikin Industies' 7H-dodecafluoroheptanoic acid (molecular weight: 346.06) (3.5 parts by weight) was used in place of Dupont's Krytox 157FS-L (average molecular weight: 2500) (25 parts by weight).

(Synthesis of Compound 6)

Compound 6 (3.5 parts by weight) was obtained in the same manner as in synthesis of the compound 1, except that Daikin Industies' 7H-dodecafluoroheptanoic acid (molecular weight: 346.06) (3.5 parts by weight) was used in place of Dupont's Krytox 157FS-L (average molecular weight: 2500) (25 parts by weight) and Chisso's Sila-ace S320 (2 parts by weight) was used in place of Chisso's Sila-ace S310 (2 parts by weight).

(Synthesis of Compound 7)

Compound 7 (4.5 parts by weight) was obtained in the same manner as in synthesis of the compound 1, except that Daikin Industies' 9H-hexadecafluorononanoic acid (molecular weight: 446.07) (4.5 parts by weight) was used in place of Dupont's Krytox 157FS-L (average molecular weight: 2500) (25 parts by weight).

(Synthesis of Compound 8)

Compound 8 (4.5 parts by weight) was obtained in the same manner as in synthesis of the compound 1, except that Daikin Industies' 9H-hexadecafluorononanoic acid (molecular weight: 446.07) (4.5 parts by weight) was used in place of Dupont's Krytox 157FS-L (average molecular weight: 200) (25 parts by weight) and Chisso's Sila-ace S320 (2 parts by weight) was used in place of Chisso's Sila-ace S310 (2 parts by weight).

Method for Formation of Liquid Repellent Layer:

The method for formation of liquid repellent layer using perfluoro polyether compound or perfluoroalkyl compound having an alkoxysilane group at the end is as follows.

First, a perfluoro polyether compound or perfluoroalkyl compound having an alkoxysilane group at the end is dissolved in a solvent. The concentration which varies depending on the coating method is about 0.01-1.0% by weight. Since alkoxysilane group is gradually hydrolyzed with water in the solvent or water incorporated into the solvent from air, it is desired to dehydrate the solvent or use a solvent which hardly dissolves water, such as fluorine-based solvent. As the fluorine-based solvent, mention may be made of FC-72, FC-77, PF-5060, PF-5080, HFE-7100 and HFE-7200 (3M), Vertrel XF (Dupont), and the like. In this way, a solution in which the perfluoro polyether compound or perfluoroalkyl compound is dissolved (hereinafter referred to as "liquid repellant") is prepared.

Next, the liquid repellant is coated on the surface of the anti-reflecting membrane. Ordinary coating methods such as dip coating, spin coating, etc. are used. Then, the coat is heated. The heating is a condition necessary for the formation of bond of alkoxysilane residue to hydroxyl group or the like on the surface, and is usually completed by carrying out at 120° C. for about 10 minutes, or at 100° C. for about 30 minutes. In the case of the heating temperature being 90° C., the heating is carried out for about 1 hour. The formation of bond proceeds even at room temperature, but requires a considerably long time.

Finally, the surface is rinsed with a fluorine-based solvent to remove excessive liquid repellant to complete the liquid repelling treatment. The solvent used for rinsing is one which is shown in explanation of the liquid repellants.

(3) Application to Lens, Projector or the Like

Figure 5:
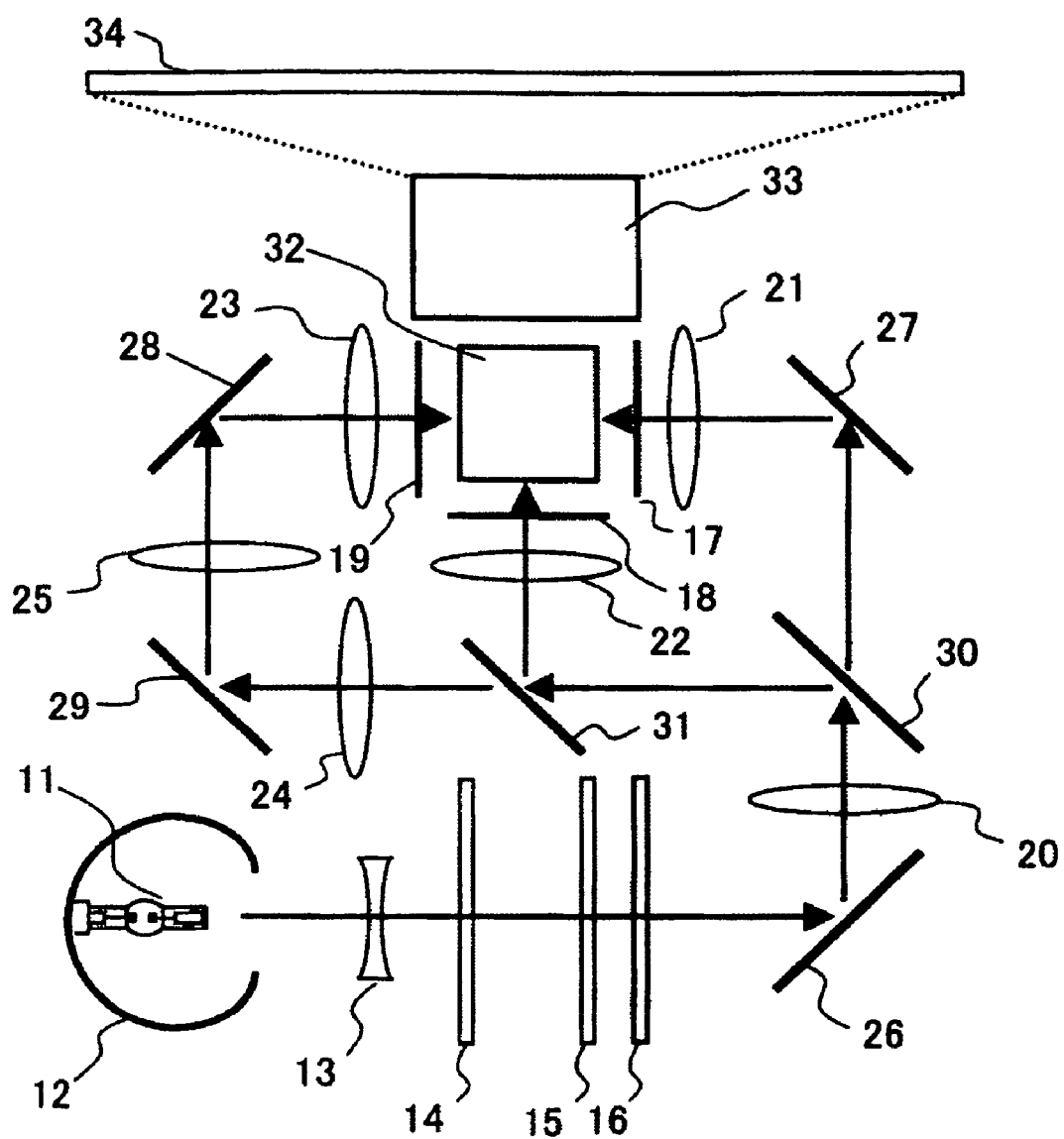
FIG. 5 is a diagrammatic view of the optical system of the liquid crystal projection type display apparatus of the present invention.

FIG. 5 schematically shows an optical system of a front projector type display apparatus.

The sequence of from outputting of light from a lamp until the light becoming an image light will be explained below.

A white light generated from a lamp 11 is collected by a reflector 12 and is emitted to a first lens array 14 through a concave lens 13. The first lens array divides the incoming beam to a plurality of beams and leads the beams to efficiently pass through a second lens array 15 and a polarization converter 16. By the second lens array, the constituting respective lens cells project the images of lens cells of the first lens array to the side of display devices 17, 18 and 19 corresponding to the three primary colors of red, green and blue (RGB). These projected images of the respective lens cells of the first lens array are superposed on the respective display devices 17, 18 and 19 by condenser lenses 20, 21, 22 and 23, and a first relay lens 24 and a second relay lens 25. Furthermore, mirrors 26-29 are also provided for changing the direction of light in the optical system. Through the above steps, the white light generated at the light source is separated to the three primary colors of RGB by dichroic mirrors 30 and 31 and irradiated to the corresponding display devices 17, 18 and 19. The images on the display devices 17, 18 and 19 are subjected to color synthesis by a dichroic-cross-prism 32 and are further projected on a screen 34 by a projection lens 33, thereby to form a large plane image. Moreover, the first relay lens and the second relay lens are for compensation of the longer light path of the display device 19 as compared with the light path of the display devices 17 and 18 from the light source. The condenser lenses 21, 22 and 23 are for inhibiting expansion of light which has passed through the display devices 17, 18 and 19 in order to attain efficient projection by the projection lens.

As mentioned above, since the outputted light passes through a light emitting tube, various lenses such as condenser and relay lenses, lens arrays, a polarization converter, display devices and dichroic-cross-prism, reflection at the surface of them can be reduced and light transmission can be improved by providing anti-reflecting membranes on the surfaces through which light passes, namely, both of the light receiving face and the light outgoing face. Moreover, the reflection at the light transmitting surface of the dichroic mirrors can be reduced by providing the anti-reflecting membrane and light transmission is improved.

Figure 6:
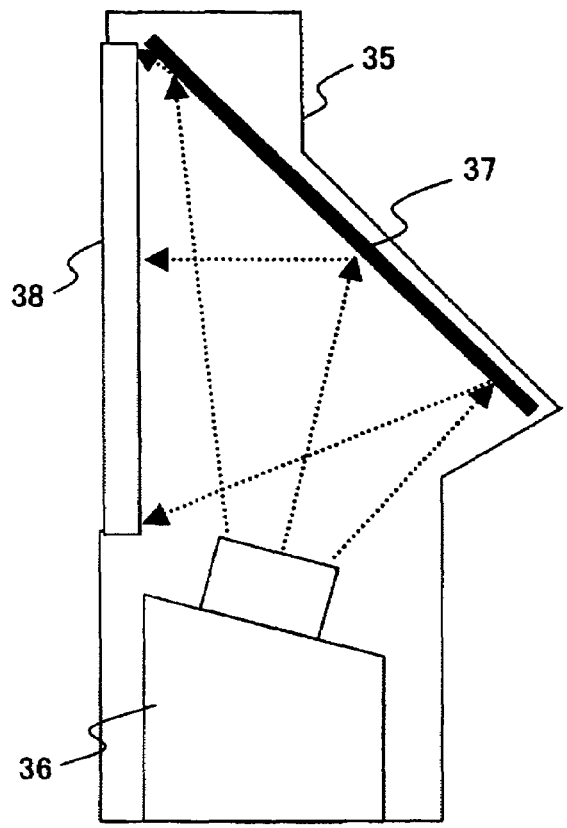
FIG. 6 is a diagrammatic view of the rear projection type display apparatus of the present invention.

FIG. 6 schematically shows the optical system of the display apparatus of rear projection type.

In the housing 35, there are an optical unit 36 (portion of the optical system of FIG. 5 from which the screen is omitted) and a rear mirror 37. The light leaving the optical unit is changed in its direction at the rear mirror and then projected on a screen 38. Thus, an image is displayed on the screen.

By providing anti-reflecting membranes on both of the light transmitting surfaces of the screen, reflection at the surfaces can be reduced and the light transmission can be improved.

Figure 7:
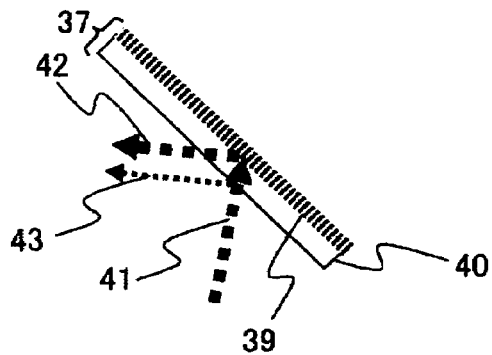
FIG. 7 is a diagrammatic view of the rear mirror of the rear projection type display apparatus of the present invention and its vicinity.
Figure 7:
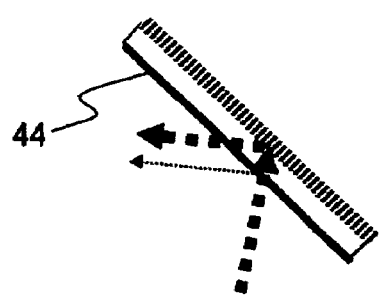

In case the mirror face 39 of the rear mirror is provided on one side of a glass plate 40 (on the side of the housing in FIG. 6), the incident light 41 leaving the optical unit is separated to image light 42 and reflected light 43 at the glass surface and projected on the screen as shown in FIG. 7, and hence there is a problem that the image is seen double and consequently the minuteness is reduced.

Therefore, it has also been confirmed that reflected light can be diminished and reduction of minuteness can be inhibited by providing an anti-reflecting membrane 44 on the incident light side of the glass.

(4) Other Uses

The anti-reflecting membrane of this embodiment can be formed on the transparent substrates such as of glass, polycarbonate resin and acrylic resin.

Therefore, the present invention is effective for the uses in which it is desired to efficiently utilize the sunlight without reflecting it. As the uses, mention may be made of the parts which transmit light, such as lens and optical filter used in various optical apparatuses. These uses include liquid crystal projector, microscope, telescope, camera, and image recording apparatuses using video and DVD. Additional uses are application to transparent walls of greenhouses for stable and rapid growth of plants, etc. Another uses are application to transparent walls of water tank for observation and enjoying animals and plants, insects, fishes, and the like for inhibiting reflection of ambient objects on the walls and improving visibility.

Similarly, for inhibiting reflection of ambient objects and improving visibility, the present invention can be applied to display apparatuses such as liquid crystal displays, plasma displays, electroluminescent (organic EL) displays which are used for televisions, portable telephones, navigator systems, display of speed and revolution number of vehicles. Specifically, it is suitable to form the anti-reflecting membrane on the outermost surface of display parts of these display apparatuses.

Moreover, the anti-reflecting membrane can be formed on the surface of panels of solar batteries for improving efficiency of electricity generation with sunlight. It is also effective to apply the anti-reflecting membrane to the outermost surface of optical storage media since laser beams in addition to sunlight can be efficiently entered.

In addition to anti-reflection, the membrane can improve light transmission and visibility even in winter of low humidity or in environment including dusts in a large amount since it is low in resistance, and dusts hardly adhere thereto. In addition, fouling resistance is improved by imparting liquid repellency, and as a result, light transmission and visibility are improved. Since the membrane of the present invention has these features, the transparent substrate plates having the membrane are also effective as interior building materials such as walls or partitions of clean room.

According to the present invention, there can be obtained optical parts having anti-reflecting membrane which is of low resistance, high adhesion and low refractive index, and by using the optical parts, it becomes possible to obtain display apparatuses of high performance.

Furthermore, the optical parts have the feature that the anti-reflecting membrane hardly gets mildewed on the surface even in the environment of high temperature and high humidity.

Description of Preferred Embodiments

The present invention will be explained in more detail by the examples, which should not be construed as limiting the invention in any manner.

EXAMPLE 1

First, a method of formation of an anti-reflecting membrane on a convex lens is shown.

(1) Cleaning

A lens made of an acrylic resin and having a diameter of 100 mm was put in a water tank containing water, and inside of the tank was vibrated by an ultrasonic cleaner, followed by rinsing with distilled water to remove dirt adhering to the surface of the lens.

(2) Preparation of an Anti-Reflecting Paint

A paint for formation of an anti-reflecting membrane (hereinafter referred to as "anti-reflecting paint") was prepared by mixing a silica sol solution as a binder (comprising water as a main solvent and 10% by weight of an alkoxysilane polymer) (2 parts by weight), a dispersion of 5% by weight of silicon dioxide having an average length of major axis of about 60 nm as inorganic oxide particles (35 parts by weight), and water (80 parts by weight).

(3) Coating of the Anti-Reflecting Paint

This paint was coated on the lens cleaned in the above (1) by spin coating. The coated paint spread nearly uniformly according to visual inspection.

(4) Heating

Immediately after spin coating, the lens was put in a thermostatic chamber controlled to 90° C. and heated 10 minutes. Thus, silica sol was converted to silicon dioxide, and thermosetting was completed. In this way, a glass plate having an anti-reflecting membrane formed on the surface was obtained.

(5) Treatment of the Back Surface

The glass plate having the anti-reflecting membrane formed on the surface was turned over, and the back surface was subjected to the treatments of the above (1), (3) and (4), whereby the same anti-reflecting membrane as on the upper surface was also formed on the back surface.

(6) Evaluation Tests

The thickness and refractive index of the anti-reflecting membrane formed on the glass plate were measured by an ellipsometer to obtain 120 nm and 1.25, respectively.

Reflectance of the lens on which the anti-reflecting membranes were formed was measured. In measurement, the reflectance was measured at 550 nm in wavelength at which men's luminosity factor is the highest. As a result, the reflectance of the lens provided with the anti-reflecting membrane was 0.5%. The reflectance of a lens made of an acrylic resin and provided with no anti-reflecting membrane was about 8%, and thus it was confirmed that the membrane had an anti-reflecting function.

Furthermore, transmittance for light of 550 nm was measured. As a result, the transmittance of the lens provided with the anti-reflecting membrane was 99%. The transmittance of a lens made of an acrylic resin and provided with no anti-reflecting membrane was about 92%, and thus it was confirmed that the membrane had a function to improve the light transmittance.

The section of the formed anti-reflecting membrane was observed by TEM to confirm presence of pores of 5-150 nm in size as shown in FIG. 3. Furthermore, according observation of the section of the membrane, the number of pores was less on the substrate plate side, and the proportion of the pores increased gradually with closing to the surface side. Thus, there was obtained a membrane having a refractive index close to that of the material of the membrane on the substrate plate side and a refractive index close to that of air on the surface side. It is supposed that the reflection at the respective interfaces can be inhibited by reducing the difference of refractive index at the respective interfaces. The distribution of the pores in the membrane in the following examples was the same as above.

The surface resistivity of the lens having the anti-reflecting membrane was measured to obtain $1 \times 10^{10} \Omega$ under the conditions of a temperature of 20° C. and a humidity of 50%. The measurement was conducted in accordance with ASTM D-257. The surface resistivity of the lens having no anti-reflecting membrane was higher than $1 \times 10^{16} \Omega$. Therefore, the lens having the anti-reflecting membrane was hardly electrostatically charged as compared with the lens having no anti-reflecting membrane, and substantially no dusts adhered to the former lens.

Next, the cross cut exfoliation test was carried out to examine adhesion of the anti-reflecting membrane. As a result, no peeling by a tape occurred.

EXAMPLE 2

A lens having an anti-reflecting membrane formed thereon was formed in the same manners as in (1)-(5) of Example 1, except that the lens made of acrylic resin was changed to a lens made of glass and having the same size as in Example 1.

The same evaluation as of (6) in Example 1 was conducted to obtain a thickness and a refractive index of 120 nm and 1.25, respectively. The reflectance at 550 nm was 0.5%. The reflectance of a lens having no anti-reflecting membrane was about 8%, and thus it was confirmed that the membrane had an anti-reflecting function.

Furthermore, transmittance for light of 550 nm was measured. As a result, the transmittance of the lens having the anti-reflecting membrane was 99%. The transmittance of a lens made of an acrylic resin and having no anti-reflecting membrane was about 92%, and thus it was confirmed that the membrane had a function to improve the light transmittance.

In the same manner as in Example 1, the surface resistivity of the lens having the anti-reflecting membrane was measured to obtain $1 \times 10^{10} \Omega$ under the conditions of a temperature of 20° C. and a humidity of 50%. The surface resistivity of the lens having no anti-reflecting membrane was $1 \times 10^{12} \Omega$. Therefore, the lens having the anti-reflecting membrane was not easily electrostatically charged as compared with the lens having no anti-reflecting membrane to cause substantially no adhesion of dusts.

In the same manner as in Example 1, the cross cut exfoliation test was carried out to examine adhesion of the anti-reflecting membrane. As a result, no peeling by a tape was seen.

COMPARATIVE EXAMPLE 1

A lens having an anti-reflecting membrane was formed in the same manners as in (1)-(5) of Example 1, except that the material of the anti-reflecting membrane was changed to magnesium fluoride and formation of the membrane was carried out by vapor deposition, not by coating.

The same evaluation as of (6) in Example 1 was conducted to obtain a thickness and a refractive index of 120 nm and 1.38, respectively. The reflectance at 550 nm was 3%. The reflectance of a lens made of an acrylic resin and having no anti-reflecting membrane was about 8%, and thus it was confirmed that the membrane had an anti-reflecting function, but this anti-reflecting function was lower than that in Example 1.

Furthermore, transmittance for light of 550 nm was measured. As a result, the transmittance of the lens having the anti-reflecting membrane was 96%. The transmittance of a lens made of an acrylic resin and having no anti-reflecting membrane was about 92%, and thus it was confirmed that the membrane had a function to improve the light transmittance, but this function was lower than that in Example 1.

In the same manner as in Example 1, the surface resistivity of the lens having the anti-reflecting membrane was measured to obtain $2 \times 10^{14} \Omega$ under the conditions of a temperature of 20° C. and a humidity of 50%. Therefore, the lens was more easily electrostatically charged as compared with the lens formed in Example 1 to cause easy adhesion of dusts.

In the same manner as in Example 1, the cross cut exfoliation test was carried out to examine adhesion of the anti-reflecting membrane. As a result, peeling of the anti-reflecting membrane was seen in the whole area to which a tape was applied.

From the above, it was confirmed that the lenses of the present invention were higher in light transmittance, inhibited from adhesion of dusts, and higher in adhesion of the anti-reflecting membrane as compared with lenses provided with conventional anti-reflecting membrane made of magnesium fluoride.

COMPARATIVE EXAMPLE 2

A lens having an anti-reflecting membrane was formed in the same manners as in Example 2, except that the material of the anti-reflecting membrane was changed to magnesium fluoride and formation of the membrane was carried out by vapor deposition, not by coating.

The same evaluation as of (6) in Example 1 was conducted to obtain a thickness and a refractive index of 120 nm and 1.38, respectively. The reflectance at 550 nm was 3%. The reflectance of a lens having no anti-reflecting membrane was about 8%, and thus it was confirmed that the membrane had an anti-reflecting function, but this anti-reflecting function was lower than that in Example 2.

Furthermore, transmittance for light of 550 nm was measured. As a result, the transmittance of the lens having the anti-reflecting membrane was 96%. The transmittance of a lens made of glass and having no anti-reflecting membrane was about 92%, and thus it was confirmed that the membrane had a function to improve the light transmittance, but this function was lower than that in Example 2.

In the same manner as in Example 2, the surface resistivity of the lens having the anti-reflecting membrane was measured to obtain $2 \times 10^{14} \Omega$ under the conditions of a temperature of 20° C. and a humidity of 50%. Therefore, the lens was more easily electrostatically charged as compared with the lens formed in Example 2 to cause easy adhesion of dusts.

In the same manner as in Example 2, the cross cut exfoliation test was carried out to examine adhesion of the anti-reflecting membrane. As a result, the peeling of the anti-reflecting membrane was seen in the part of 50% of the whole membrane.

From the above, it was confirmed that the lenses of the present invention were higher in light transmittance, inhibited from adhesion of dusts, and higher in adhesion of the anti-reflecting membrane as compared with the lenses provided with conventional anti-reflecting membrane made of magnesium fluoride.

EXAMPLE 3

A polarization converter having anti-reflecting membrane was formed in the same manner as in Example 1, except that the same anti-reflecting membrane as of Example 1 was formed on both the light receiving face and the light outgoing face of a polarization converter in place of the lens. As a result, it was confirmed that the light transmittance for 550 nm of this polarization converter was improved by about 7% as compared with that of a polarization converter having no anti-reflecting membrane. Furthermore, it was confirmed that the light transmittance of this polarization converter was improved by about 3% as compared with that of a polarization converter having the conventional anti-reflecting membranes made of magnesium fluoride.

EXAMPLE 4

A display device having anti-reflecting membrane was formed in the same manner as in Example 1, except that the same anti-reflecting membrane as of Example 1 was formed on both the light receiving face and the light outgoing face of a display device in place of the lens. As a result, it was confirmed that the light transmittance for 550 nm of this display device was improved by about 7% as compared with that of a display device having no anti-reflecting membrane. Furthermore, it was further confirmed that the light transmittance of this display device was improved by about 3% as compared with that of a display device having the conventional anti-reflecting membranes made of magnesium fluoride.

EXAMPLE 5

A dichroic-cross-prism having anti-reflecting membranes was formed in the same manner as in Example 1, except that the same anti-reflecting membranes as of Example 1 were formed on the four faces in total of the light receiving faces (three faces) and the light outgoing face of a dichroic-cross-prism in place of the lens. As a result, it was confirmed that the light transmittance for 550 nm of this dichroic-cross-prism was improved by about 7% as compared with that of a dichroic-cross-prism having no anti-reflecting membrane. Furthermore, it was further confirmed that the light transmittance of this dichroic-cross-prism was improved by about 3% as compared with that of a dichroic-cross-prism having the conventional anti-reflecting membranes made of magnesium fluoride.

EXAMPLE 6

A dichroic mirror having anti-reflecting membrane was formed in the same manner as in Example 1, except that the same anti-reflecting membrane as of Example 1 was formed on the light outgoing face of a dichroic mirror in place of the lens. The anti-reflecting membrane was not provided on the light receiving face which was a mirror face. As a result, it was confirmed that the light transmittance for 550 nm of this dichroic mirror was improved by about 7% as compared with that of a dichroic mirror having no anti-reflecting membrane. Furthermore, it was further confirmed that the light transmittance of this dichroic mirror was improved by about 3% as compared with that of a dichroic mirror having the conventional anti-reflecting membrane made of magnesium fluoride.

EXAMPLE 7

The optical parts having anti-reflecting membrane which were produced in Examples 1-6 were subjected to a liquid repelling treatment.

(1) Preparation of a Liquid Repellant Solution

First, 0.5 wt % solutions of the compounds 1-12 (solvent: 3M's PF-5080) were prepared. These were used as liquid repellant solutions. The 0.1 wt % PF-5080 solution of the compound 1, the 0.1 wt % PF-5080 solution of the compound 2, - - -, and the 0.1 wt % PF-5080 solution of the compound 12 are referred to as liquid repellant solution [1], liquid repellant solution [2], - - -, and liquid repellant solution [12], respectively.

Furthermore, for comparison, a 0.1 wt % solution of CYTOP CTL-107M (Asahi Glass) was used as a liquid repellant solution [13].

(2) Method of Liquid Repelling Treatment

In the case of using liquid repellant solutions [1]-[12]:

Each optical part was dipped in the liquid repellant solution for 3 minutes. The optical part was taken out and left to stand for 30 minutes in a thermostat chamber the inside of which was heated to 95° C. The optical part was taken out and the surface of the optical part was rinsed with PF-5080 to remove the excessive liquid repellant solution. Thus, the treatment was completed.

In the case of using liquid repellant solution [13]:

Each optical part was dipped in the liquid repellant solution for 3 minutes. The optical part was taken out and left to stand for 90 minutes in a thermostat chamber the inside of which was heated to 95° C. The optical part was taken out to complete the treatment.

(3) Evaluation of Liquid Repellency

The liquid repellency of the surface of the optical parts after subjected to the liquid repelling treatment was evaluated in terms of contact angle with water. The results are shown in Tables 1-6.

TABLE 1

Contact angle with water, refractive index, light transmittance and surface resistance of optical parts of the present invention before and after subjected to the liquid repelling treatment
(lens produced in Example 1 and subjected to the liquid repelling treatment)

| Liquid repelling state | | Contact angle with water (°) | Refractive index* | Improvement of light transmission (%)** | Membrane resistance (×$10^{10}$ Ω) |
|---|---|---|---|---|---|
| Before treatment | | smaller than 10° | 1.25 | 7 | 1.0 |
| After treatment | Compound 1 | 106 | 1.25 | 7 | 1.0 |
| | Compound 2 | 106 | 1.25 | 7 | 1.0 |
| | Compound 3 | 110 | 1.25 | 7 | 1.0 |
| | Compound 4 | 110 | 1.25 | 7. | 1.0 |
| | Compound 5 | 86 | 1.25 | 7 | 1.0 |
| | Compound 6 | 86 | 1.25 | 7 | 1.0 |
| | Compound 7 | 88 | 1.25 | 7 | 1.0 |
| | Compound 8 | 88 | 1.25 | 7 | 1.0 |
| | Compound 9 | 92 | 1.25 | 7 | 1.0 |
| | Compound 10 | 96 | 1.25 | 7 | 1.0 |
| | Compound 11 | 92 | 1.25 | 7 | 1.0 |
| | Compound 12 | 96 | 1.25 | 7 | 1.0 |
| | Compound 13 | 105 | 1.3 | 5 | $10^6$ or higher |

*Refractive index of the surface of anti-reflecting membrane
**Improvement of transmission for light of 550 nm as compared with a lens having no anti-reflecting membrane.

TABLE 2

Contact angle with water, refractive index, light transmittance and surface resistance of optical part of the present invention before and after liquid repelling treatment
(lens produced in Example 2 and subjected to liquid repelling treatment)

| Liquid repelling state | | Contact angle with water (°) | Refractive index* | Improvement of light transmission (%)** | Membrane resistance (×$10^{10}$ Ω) |
|---|---|---|---|---|---|
| Before treatment | | smaller than 10° | 1.25 | 7 | 1.0 |
| After treatment | Compound 1 | 106 | 1.25 | 7 | 1.0 |
| | Compound 2 | 106 | 1.25 | 7 | 1.0 |
| | Compound 3 | 110 | 1.25 | 7 | 1.0 |
| | Compound 4 | 110 | 1.25 | 7 | 1.0 |
| | Compound 5 | 86 | 1.25 | 7 | 1.0 |
| | Compound 6 | 86 | 1.25 | 7 | 1.0 |
| | Compound 7 | 88 | 1.25 | 7 | 1.0 |
| | Compound 8 | 88 | 1.25 | 7 | 1.0 |
| | Compound 9 | 92 | 1.25 | 7 | 1.0 |
| | Compound 10 | 96 | 1.25 | 7 | 1.0 |
| | Compound 11 | 92 | 1.25 | 7 | 1.0 |
| | Compound 12 | 96 | 1.25 | 7 | 1.0 |
| | Compound 13 | 105 | 1.3 | 5 | $10^6$ or higher |

*Refractive index of the surface of anti-reflecting membrane
**Improvement of transmission for light of 550 nm as compared with a lens having no anti-reflecting membrane.

TABLE 3

Contact angle with water, refractive index, light transmittance and surface resistance of optical part of the present invention before and after liquid repelling treatment (polarization converter produced in Example 3 and subjected to liquid repelling treatment)

| Liquid repelling state | | Contact angle with water (°) | Refractive index* | Improvement of light transmission (%)** | Membrane resistance (×10¹⁰ Ω) |
|---|---|---|---|---|---|
| Before treatment | | smaller than 10° | 1.25 | 7 | 1.0 |
| After treatment | Compound 1 | 106 | 1.25 | 7 | 1.0 |
| | Compound 2 | 106 | 1.25 | 7 | 1.0 |
| | Compound 3 | 110 | 1.25 | 7 | 1.0 |
| | Compound 4 | 110 | 1.25 | 7 | 1.0 |
| | Compound 5 | 86 | 1.25 | 7 | 1.0 |
| | Compound 6 | 86 | 1.25 | 7 | 1.0 |
| | Compound 7 | 88 | 1.25 | 7 | 1.0 |
| | Compound 8 | 88 | 1.25 | 7 | 1.0 |
| | Compound 9 | 92 | 1.25 | 7 | 1.0 |
| | Compound 10 | 96 | 1.25 | 7 | 1.0 |
| | Compound 11 | 92 | 1.25 | 7 | 1.0 |
| | Compound 12 | 96 | 1.25 | 7 | 1.0 |
| | Compound 13 | 105 | 1.3 | 5 | $10^6$ or higher |

*Refractive index of the surface of anti-reflecting membrane
**Improvement of transmission for light of 550 nm as compared with a polarization converter having no anti-reflecting membrane.

TABLE 4

Contact angle with water, refractive index, light transmittance and surface resistance of optical part of the present invention before and after liquid repelling treatment (display device produced in Example 4 and subjected to liquid repelling treatment)

| Liquid repelling state | | Contact angle with water (°) | Refractive index* | Improvement of light transmission (%)** | Membrane resistance (×10¹⁰ Ω) |
|---|---|---|---|---|---|
| Before treatment | | smaller than 10° | 1.25 | 7 | 1.0 |
| After treatment | Compound 1 | 106 | 1.25 | 7 | 1.0 |
| | Compound 2 | 106 | 1.25 | 7 | 1.0 |
| | Compound 3 | 110 | 1.25 | 7 | 1.0 |
| | Compound 4 | 110 | 1.25 | 7 | 1.0 |
| | Compound 5 | 86 | 1.25 | 7 | 1.0 |
| | Compound 6 | 86 | 1.25 | 7 | 1.0 |
| | Compound 7 | 88 | 1.25 | 7 | 1.0 |
| | Compound 8 | 88 | 1.25 | 7 | 1.0 |
| | Compound 9 | 92 | 1.25 | 7 | 1.0 |
| | Compound 10 | 96 | 1.25 | 7 | 1.0 |
| | Compound 11 | 92 | 1.25 | 7 | 1.0 |
| | Compound 12 | 96 | 1.25 | 7 | 1.0 |
| | Compound 13 | 105 | 1.3 | 5 | $10^6$ or higher |

*Refractive index of the surface of anti-reflecting membrane
**Improvement of transmission for light of 550 nm as compared with a display device having no anti-reflecting membrane.

TABLE 5

Contact angle with water, refractive index, light transmittance and surface resistance of optical part of the present invention before and after liquid repelling treatment (dichroic-cross-prism produced in Example 5 and subjected to liquid repelling treatment)

| Liquid repelling state | | Contact angle with water (°) | Refractive index* | Improvement of light transmission (%)** | Membrane resistance (×10¹⁰ Ω) |
|---|---|---|---|---|---|
| Before treatment | | smaller than 10° | 1.25 | 7 | 1.0 |
| After treatment | Compound 1 | 106 | 1.25 | 7 | 1.0 |
| | Compound 2 | 106 | 1.25 | 7 | 1.0 |
| | Compound 3 | 110 | 1.25 | 7 | 1.0 |
| | Compound 4 | 110 | 1.25 | 7 | 1.0 |
| | Compound 5 | 86 | 1.25 | 7 | 1.0 |

TABLE 5-continued

Contact angle with water, refractive index, light transmittance and surface resistance of optical part of the present invention before and after liquid repelling treatment (dichroic-cross-prism produced in Example 5 and subjected to liquid repelling treatment)

| Liquid repelling state | Contact angle with water (°) | Refractive index* | Improvement of light transmission (%)** | Membrane resistance (×10$^{10}$ Ω) |
|---|---|---|---|---|
| Compound 6 | 86 | 1.25 | 7 | 1.0 |
| Compound 7 | 88 | 1.25 | 7 | 1.0 |
| Compound 8 | 88 | 1.25 | 7 | 1.0 |
| Compound 9 | 92 | 1.25 | 7 | 1.0 |
| Compound 10 | 96 | 1.25 | 7 | 1.0 |
| Compound 11 | 92 | 1.25 | 7 | 1.0 |
| Compound 12 | 96 | 1.25 | 7 | 1.0 |
| Compound 13 | 105 | 1.3 | 5 | 10$^6$ or higher |

*Refractive index of the surface of anti-reflecting membrane
**Improvement of transmission for light of 550 nm as compared with a dichroic-cross-prism having no anti-reflecting membrane.

TABLE 6

Contact angle with water, refractive index, light transmittance and surface resistance of optical part of the present invention before and after liquid repelling treatment (dichroic mirror produced in Example 6 and subjected to liquid repelling treatment)

| | Liquid repelling state | Contact angle with water (°) | Refractive index* | Improvement of light transmission (%)** | Membrane resistance (×10$^{10}$ Ω) |
|---|---|---|---|---|---|
| Before treatment | | smaller than 10° | 1.25 | 3 | 1.0 |
| After treatment | Compound 1 | 106 | 1.25 | 3 | 1.0 |
| | Compound 2 | 106 | 1.25 | 3 | 1.0 |
| | Compound 3 | 110 | 1.25 | 3 | 1.0 |
| | Compound 4 | 110 | 1.25 | 3 | 1.0 |
| | Compound 5 | 86 | 1.25 | 3 | 1.0 |
| | Compound 6 | 86 | 1.25 | 3 | 1.0 |
| | Compound 7 | 88 | 1.25 | 3 | 1.0 |
| | Compound 8 | 88 | 1.25 | 3 | 1.0 |
| | Compound 9 | 92 | 1.25 | 3 | 1.0 |
| | Compound 10 | 96 | 1.25 | 3 | 1.0 |
| | Compound 11 | 92 | 1.25 | 3 | 1.0 |
| | Compound 12 | 96 | 1.25 | 3 | 1.0 |
| | Compound 13 | 105 | 1.3 | 2 | 10$^6$ or higher |

*Refractive index of the surface of anti-reflecting membrane
**Improvement of transmission for light of 550 nm as compared with a dichroic mirror having no anti-reflecting membrane.

The contact angle with water before the liquid repelling treatment, and the refractive index, reflectance and surface resistance before and after the liquid repelling treatment are also shown in the above tables.

Before the liquid repelling treatment, the contact angle with water of all the anti-reflecting membranes was smaller than 10°. However, the contact angle of all the membranes became larger by the liquid repelling treatment. Since the refractive index and reflectance did not change before and after the liquid repelling treatment, it was shown that the liquid repelling treatment did not deteriorate the performances relating to optical characteristics.

However, only the optical parts treated with the 0.1% solution of CYTOP CTL-107M were high in resistance. It is considered that this is because CYTOP CTL-107M nearly completely covered the surface of the anti-reflecting membrane while in the case of the compounds 1-12, liquid repellent fluorine-containing chains bonded to several portions of the surface of the anti-reflecting membrane through alkoxysilane groups, and consequently the anti-reflecting membrane was not completely covered, resulting in substantially no change of resistance. When membrane resistance increases, the membrane becomes readily chargeable and dirt or dusts are apt to adhere to the membrane. Therefore, the compounds 1-12 which do not increase the membrane resistance are suitable because the state in which dusts or dirt hardly adhere to the membrane can be maintained.

The above results show that in liquid repelling treatment, fluorine compounds having alkoxysilane group at the end are suitable because the membrane resistance does not increase even if liquid repellency is imparted.

When comparison is made among the compounds used for the liquid repelling treatment, the compounds 1-4 gave larger contact angles, and at the least, the contact angle was 106° in the case of treating the membrane of Example 2 with compound 1 or 2. Particularly, when compounds 3 and 4 were used, the contact angle was large, namely, 110° for all the membranes. The large contact angle means that the membrane is excellent in fouling resistance, and hence it is desired that the contact angle is as large as possible. The compounds 1-4 have perfluoro polyether chains, and other compounds have perfluoroalkyl chains or fluoroalkyl chains. Thus, it is shown that membranes superior in liquid repellency can be formed by carrying out the treatment with compounds having perfluoro polyether chains.

EXAMPLE 8

A lens having anti-reflecting membrane was formed in the same manner as in Example 1, except that the anti-reflecting paint was coated by dip coating, not by spin coating. The resulting lens was evaluated in the same manner as in (6) of Example 1 to obtain the results similar to those in Example 1. Thus, it is shown that the anti-reflecting membrane can also be formed not only by spin coating, but also by dip coating and other coating methods.

EXAMPLE 9

A lamp having anti-reflecting membrane on the surface was formed in the same manner as in Example 8, except that the paint was dip coated on a lamp in place of the lens. It was confirmed that this lamp was improved by about 3% in intensity of light at 550 nm as compared with a lamp having no anti-reflecting membrane.

EXAMPLE 10

Display apparatuses having the optical system shown in FIG. 5 were made using the optical parts formed in Examples 1-6 and 9, and images were displayed. There were obtained images improved about 1.5 time in brightness as compared with those displayed by a display apparatus made using the optical parts having conventional anti-reflecting membrane made of magnesium fluoride. It is considered that this is because the effect of the anti-reflecting membrane to improve light transmittance was exhibited.

In the case of providing no anti-reflecting membrane made of magnesium fluoride, the brightness decreased to 73% which was conventionally obtained.

EXAMPLE 11

The following 17 compounds were examined as mildew proofing agents.

Compound 13
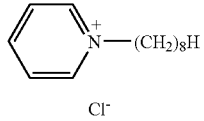

Compound 14
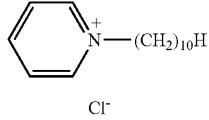

Compound 15
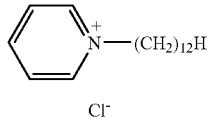

Compound 16
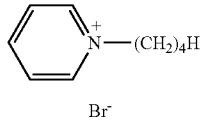

-continued

Compound 17
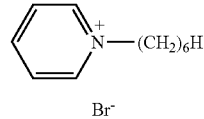

Compound 18
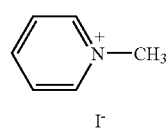

Compound 19
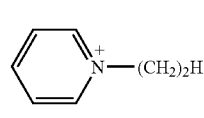

Compound 20
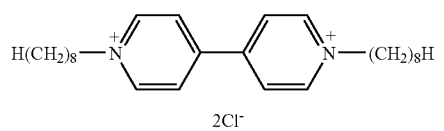

Compound 21
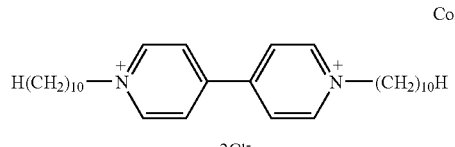

Compound 22
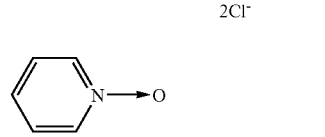

Compound 23
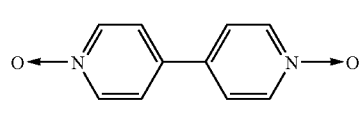

Compound 24
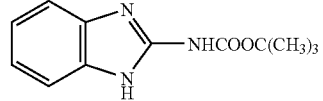

Compound 25
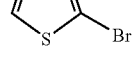

Compound 26
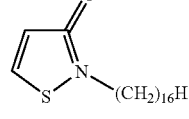

Compound 27
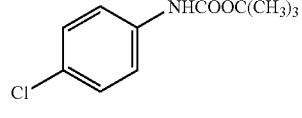

Compound 28

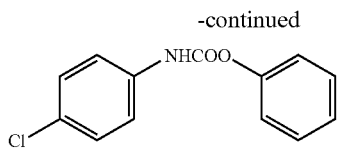

Compound 29

Compounds 13-19 are compounds having a pyridinium salt structure. Compounds 20 and 21 are compounds having a dipyridinium salt structure. Compound 22 is a compound having a pyridine-N-oxide structure. Compound 23 is a compound having a dipyridyl-N-oxide structure. Compound 24 is a compound having a benzimidazole structure. Compound 25 is a compound having a thiazole compound. Compound 26 is a compound having an isothiazole structure. Compounds 27-29 are organic compounds having a halogen atom and a carbamate structure.

2 wt % ethanol solutions of these mildew proofing agents were prepared.

Next, paints for anti-reflecting membrane were prepared by the following method.

Anti-reflecting paints containing the mildew proofing agent were prepared by mixing a silica sol solution as a binder (containing 2-propanol as a main solvent and 10% by weight of an alkoxysilane polymer) (2 parts by weight), a 5 wt % dispersion of silicon dioxide having an average length of major axis of about 60 nm as inorganic oxide particles (35 parts by weight), 2-propanol (100 parts by weight), and a 2 wt % 2-propanol solution of the mildew proofing agent (2 parts by weight). Here, 2-propanol was used as the solvent because most of the mildew proofing agents only partially dissolve in water.

Next, the same lens of acrylic resin as used in Example 1 as one of the optical parts of the present invention was cleaned in the same manner as in Example 1, and thereafter the lens was coated with the anti-reflecting paint containing the mildew proofing agent in place of the anti-reflecting paint used in Example 1, followed by heating the coat. In this case, the anti-reflecting paint was also coated on the back surface of the lens as in Example 1. Thus, a lens having an anti-reflecting membrane containing the mildew proofing agent was produced.

Reflectance of the resulting lenses having the anti-reflecting membrane containing the mildew proofing agent was measured. The measurement wavelength was 550 nm. As a result, the reflectance of these lenses was 0.5-0.6%. The reflectance of the acrylic resin lenses having no anti-reflecting membrane was about 8%, and it was confirmed that the membranes containing the mildew proofing agents of the present invention also had anti-reflecting function. Furthermore, the light transmittance for 550 nm of these lenses was determined. As a result, the transmittance of these lenses was 99%. The transmittance of the acrylic resin lenses having no anti-reflecting membrane was about 92%, and it was confirmed that the membrane had a function to improve the light transmission. Then, the cross cut exfoliation test was carried out to examine adhesion of the anti-reflecting membrane containing the mildew proofing agent. As a result, no peeling by tape was seen.

Next, in order to confirm whether these lenses had mildew proofness or not, these lenses were left to stand for 1 week in a thermo-hygrostat of 40° C. and 95% RH. For comparison, the lens having the anti-reflecting membrane containing no mildew proofing agent was also left to stand together. After 1 week, it was confirmed by visual inspection and inspection with a 5× magnifier whether mildews grew or not. The results are shown in Table 7.

TABLE 7

Growing or not growing of mildews on the optical parts of the present invention when they were left to stand in thermo-hygrostat

| Mildew proofing agent | Growing of mildew |
|---|---|
| Compound 13 | o |
| Compound 14 | o |
| Compound 15 | o |
| Compound 16 | o |
| Compound 17 | o |
| Compound 18 | o |
| Compound 19 | o |
| Compound 20 | o |
| Compound 21 | o |
| Compound 22 | o |
| Compound 23 | o |
| Compound 24 | o |
| Compound 25 | o |
| Compound 26 | o |
| Compound 27 | o |
| Compound 28 | o |
| Compound 29 | o |
| No mildew proofing agent | xx | o: Growing of mildews was not recognized by visual inspection and inspection with a 5x magnifier.
x: Growing of mildews was not recognized by visual inspection, but recognized by inspection with a 5x magnifier.
xx: Growing of mildews was recognized by both the visual inspection and the inspection with a 5x magnifier.

A white fibrous material adhered to the surface of the lens containing no mildew proofing agent after left to stand for 1 week. The white fibrous material was analyzed to find that this was a mildew, while growing of mildews was not seen for the lenses having anti-reflecting membrane containing mildew proofing agent.

Then, the lenses having the anti-reflecting membrane containing the mildew proofing agent were dipped in hot water at 40° C. for 1 hour and thereafter were left to stand for 1 week in a thermo-hygrostat of 40° C. and 95% RH. After lapse of 1 week, it was examined by visual inspection and inspection with a 5× magnifier whether mildews grew or not. The results are shown in Table 8.

TABLE 8

Growing or not growing of mildews on the optical parts of the present invention when they were left to stand in thermo-hygrostat after dipping in hot water

| Mildew proofing agent | Growing of mildew | Proportion of nitrogen in compound (wt %) | Structure of compound |
|---|---|---|---|
| Compound 13 | x | 6.15 | Pyridinium salt structure |
| Compound 14 | o | 5.48 | Pyridinium salt structure |
| Compound 15 | o | 4.12 | Pyridinium salt structure |
| Compound 16 | x | 6.48 | Pyridinium salt structure |
| Compound 17 | o | 5.74 | Pyridinium salt structure |
| Compound 18 | x | 6.34 | Pyridinium salt structure |
| Compound 19 | o | 5.96 | Pyridinium salt structure |
| Compound 20 | x | 6.71 | Dipyridinium salt structure |
| Compound 21 | o | 5.91 | Dipyridinium salt structure | o: Growing of mildews was not recognized by visual inspection and inspection with a 5x magnifier.
x: Growing of mildews was not recognized by visual inspection, but recognized by inspection with a 5x magnifier.
xx: Growing of mildews was recognized by both the visual inspection and the inspection with a 5x magnifier.

Growing of a few mildews was seen on the lens containing compounds 13, 16, 18 and 20 as mildew proofing agents. Compounds 13-19 had a pyridinium salt structure and compounds 20 and 21 had a dipyridinium salt structure. In compounds 13, 16, 18 and 20, the elemental proportion of nitrogen was 6% by weight or more. When the elemental proportion of nitrogen was high, the proportion of quaternary salt structure portion of nitrogen in the hydrophilic pyridine ring or bipyridine ring in the compound increased, resulting in easy dissolution in water. Therefore, it is considered that by dipping the lens in hot water of 40° C. which was an acceleration test of high humidity test, a part of the mildew proofing agent in the anti-reflecting membrane dissolved in the hot water, and hence the mildew proofing agent in the membrane diminished to cause reduction of mildew proofing effect, resulting in growing of mildews.

From the above results, it is shown that in the case of using mildew proofing agents having a pyridinium salt structure or a dipyridinium salt structure, the proportion of nitrogen in the compounds is suitably less than 6% by weight.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical part which transmits or partially reflects light where a light receiving face or a light outgoing face has an anti-reflecting membrane which comprises inorganic oxide particles and a binder, has a thickness of 60-190 nm, and has pores of 5-200 nm in size, wherein the anti-reflecting membrane contains an organic compound having a polvalkylene glycol chain.

2. An optical part according to claim 1, wherein the inorganic oxide particles are silicon dioxide particles and the binder comprises a silicon compound.

3. An optical part according to claim 1, wherein the particles have a major axis diameter of not more than 190 nm and a minor axis diameter less than the thickness of the membrane.

4. An optical part according to claim 1, wherein the anti-reflecting membrane has a layer comprising a fluorine compound on the surface.

5. An optical part according to claim 4, wherein the fluorine compound has the following structure and the layer is bonded to the surface of the anti-reflecting membrane through chemical bonding:

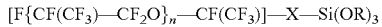

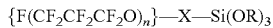

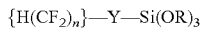

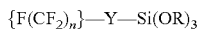

in which X is a bonding portion of perfluoro polyether chain and alkoxysilane residue, Y is a bonding portion of perfluoroalkyl chain and alkoxysilane residue, and R is an alkyl group.

6. An optical part which transmits or partially reflects light where a light receiving face or a light outgoing face has an anti-reflecting membrane which comprises inorganic oxide particles and a binder, has a thickness of 60-190 nm, and has pores of 5-200 nm in size, wherein the anti-reflecting membrane contains an organic compound having a salt structure.

7. An optical part according to claim 6, wherein the anti-reflecting membrane contains the organic compound having a pyridinium salt structure or a dipyridinium salt structure.

8. An optical part according to claim 6, wherein the anti-reflecting membrane contains the organic compound having a pyridinium salt structure or a dipyridinium salt structure, and the proportion of nitrogen in the organic compound is less than 6% by weight.

9. An optical part according to claim 6, wherein the anti-reflecting membrane contains an organic compound having a pyridine-N-oxide structure or a dipyridyl-N-oxide structure.

10. An optical part according to claim 6, wherein the anti-reflecting membrane contains an organic compound having a benzimidazole structure or a thiazole structure.

11. An optical part according to claim 6, wherein the anti-reflecting membrane contains an organic compound having a halogen atom and a carbamate structure.

12. An optical part according to claim 6, which is at least one of a lens, a polarization converter, a dichroic mirror, a display device, a dichroic-cross-prism, a light emitting tube, a mirror, and a screen.

13. A projection type display apparatus which reflects and emits a light beam from a light source, subjects the light beam from the light source to light intensity modulation by a display device, magnifies the image light subjected to light intensity modulation by a projection lens, and displays the magnified image light, wherein the anti-reflecting membrane according to claim 1 or 6 is formed on at least one light receiving face of at least one optical part of a plurality of lenses, a polarization converter, a dichroic mirror, a display device, a dichroic-cross-prism, a light emitting tube, a mirror, and a screen which are incorporated in the apparatus.

14. An optical part according to claim 6, wherein the inorganic oxide particles are silicon dioxide particles and the binder comprises a silicon compound.

15. An optical part according to claim 6, wherein the particles have a major axis diameter of not more than 190 nm and a minor axis diameter less than the thickness of the membrane.

16. An optical part according to claim 6, wherein the anti-reflecting membrane has a layer comprising a fluorine compound on the surface.

17. An optical part according to claim 6, wherein the fluorine compound has the following structure and the layer is bonded to the surface of the anti-reflecting membrane through chemical bonding:

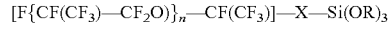

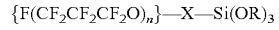

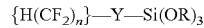

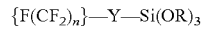

in which X is a bonding portion of perfluoro polyether chain and alkoxysilane residue, Y is a bonding portion of perfluoroalkyl chain and alkoxysilane residue, and R is an alkyl group.

* * * * *